United States Patent [19]

Park et al.

[11] Patent Number: 4,740,881

[45] Date of Patent: Apr. 26, 1988

[54] SIMULTANEOUS RECOVERY COMMUTATION CURRENT SOURCE INVERTER FOR AC MOTORS DRIVES

[75] Inventors: Sun-Soon Park; Gyu-Hyeong Cho, both of Seoul, Rep. of Korea

[73] Assignee: Korea Advanced Institute of Science and Technology, Seoul, Rep. of Korea

[21] Appl. No.: 994

[22] Filed: Jan. 7, 1987

[30] Foreign Application Priority Data

Jan. 11, 1986 [KR] Rep. of Korea ............... 136/1986

[51] Int. Cl.$^4$ ............................................. H02M 7/521
[52] U.S. Cl. ......................................... 363/138; 363/71
[58] Field of Search ................... 363/71, 136, 137, 138

[56] References Cited

U.S. PATENT DOCUMENTS

| | | | |
|---|---|---|---|
| 3,812,416 | 5/1974 | Lalande | 363/138 X |
| 3,980,941 | 9/1976 | Griebel | 363/138 |
| 4,054,818 | 10/1977 | Risberg | 363/138 X |
| 4,317,166 | 2/1982 | Winkler et al. | 363/138 X |
| 4,318,171 | 3/1982 | Winkler et al. | 363/138 |
| 4,403,280 | 9/1983 | Okado | 363/138 X |

Primary Examiner—Patrick R. Salce
Assistant Examiner—Marc S. Hoff
Attorney, Agent, or Firm—Holman & Stern

[57] ABSTRACT

A simultaneous recovery commutation current source inverter is provided by connecting three AC output terminals of a main inverter and an auxiliary inverter in parallel with each other and to three terminals of an induction motor, providing a high AC impedance DC current source through inductors connected in series to a variable DC electric source so that DC electric power is supplied to both sides of a main DC bus of the main inverter, providing a low AC impedance DC voltage source by supplying DC electric power to both sides of an auxiliary DC bus of the auxiliary inverter through a rectifying circuit from the respective connecting points of the main inverter, auxiliary inverter and the three motor terminals. Snubber circuits may be added to the respective semiconductor elements for safe switching operation.

9 Claims, 27 Drawing Sheets

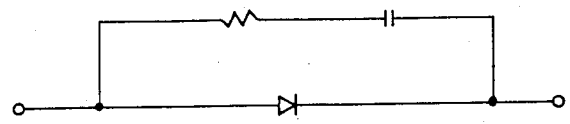
FIG. 6b
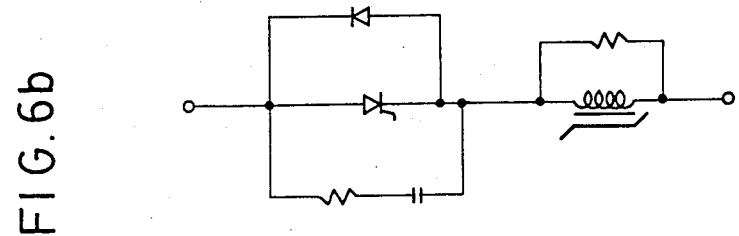
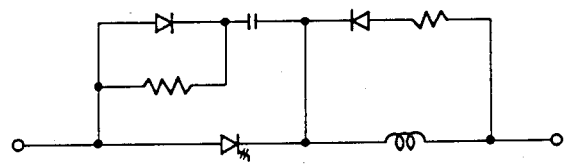

SIMULTANEOUS RECOVERY COMMUTATION CURRENT SOURCE INVERTER FOR AC MOTORS DRIVES

BACKGROUND OF THE INVENTION

1. Field of the Invention

The present invention relates to a new current source inverter for driving AC motors such as three-phase induction motors and synchronous motors. More particularly, this invention is concerned with a current source inverter which can markedly reduce stresses on the high voltage thyristors and the high voltage motor terminals, and which can operate at a high efficiency over a much wider frequency range with much lower voltage stresses on the motor terminals and the power devices.

2. Description of the Prior Art

Current source inverters (CSI) are well known in the art. The most widely used CSIs include an auto-sequentially commutated inverter (ASCI) (K. P. Phillips, "Current Source Converter for AC Motor Drives," IEEE Trans. Ind. Appl., Vol. IA-6, pp. 679–683 Nov./Dec. 1972). The ASCI has many advantages such as ruggedness, fuseless protection, full four-quadrant operation, etc., whereas it has quite a few drawbacks in that it requires: (1) a number of large high voltage capacitors: (2) high voltage thyristors and power diodes; (3) high voltage motor terminal stresses (i.e., surges); and (4) a limited range of operating frequencies. Thus, the ASCI is usually designed by compromising high voltage stresses and operating range. In spite of such limitations, the ASCI has been prepared simply because no other CSI comparable with the prior art ASCI has been developed. Further disadvantages with respect to the prior art ASCI will be discussed hereinafter with reference to the accompanying drawings.

SUMMARY OF THE INVENTION

Therefore, the object of the invention is to provide a new current source inverter wherein the above prior art disadvantages have been eliminated.

This and other objects can be achieved by the invention which is formed by connecting three AC output terminals of a main inverter and an auxiliary inverter in parallel with each other and to three terminals of an induction motor, providing a high AC impedance DC current source through an inductor connected in series to a variable DC electric source so that DC electric power is supplied to both sides of a main DC bus of the main inverter; providing a low AC impedance DC voltage source by supplying the DC electric power to both sides of an auxiliary DC bus of the auxiliary inverter through a rectifying circuit consisting of diodes at both sides of the auxiliary DC electric source bus from the respective connecting points of the main inverter, auxiliary inverter and the three motor terminals and by connecting a capacitor in parallel between both of these sides supplied with positive and negative DC voltage at both sides of the auxiliary DC bus, respectively, under normal operation; and connecting a snubber circuit comprising inductors, resistances and diodes which are added in series or parallel to respective semiconductor elements for safe switching operation thereof.

BRIEF DESCRIPTION OF THE DRAWINGS

The present invention will be further illustrated by means of the accompanying drawings, wherein:

FIG. 6B shows exemplified diagrams of the snubber circuit for respective elements;

PREFERRED EMBODIMENTS OF THE INVENTION

Figure 1A:
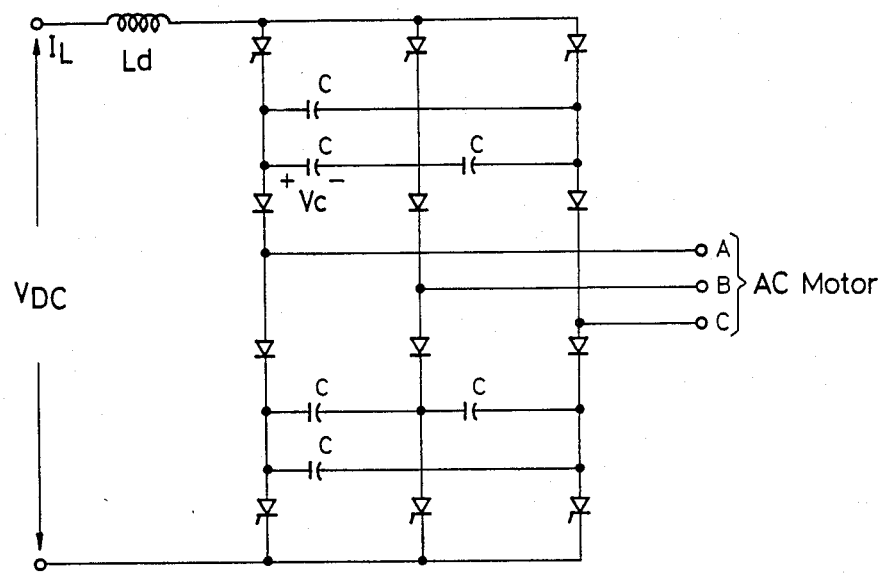
FIG. 1A shows a schematic circuit diagram of a typical prior art auto-sequentially commutated inverter.
Figure 1B:
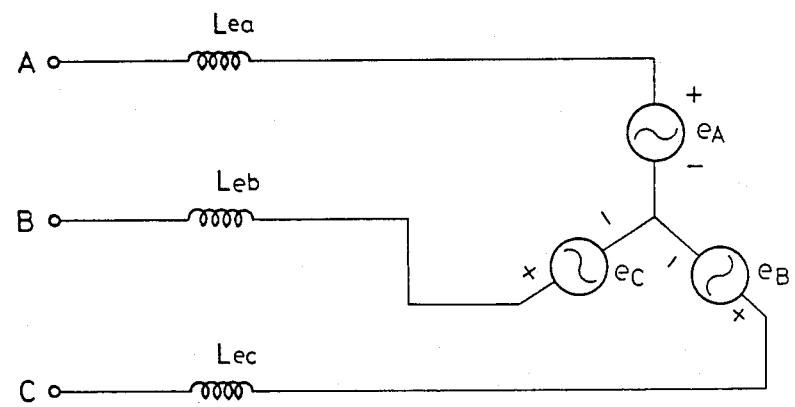
FIG. 1B shows a schematic equivalent circuit diagram of the AC motor connected to the inverter of FIG. 1A.

Referring first to FIG. 1A, there is shown a typical prior art ASCI system. The ASCI system requires six thyristors, six diodes and six capacitors. In order to help the understanding of the operation of the current source inverter, the equivalent circuit of an AC motor connected to the inverter can be expressed as in FIG. 1B. This expression method is used in W. Farrer and J. D. Miskin, "Quasi-sine-wave fully regenerative inverter" (IEE Proc., Vol. 120, No. 9, Sept./1973). In the ASCI system, the capacitors commutate the thyristors and absorb the energy stored when the current flows to the leakage inductor Lea, Leb, Lec during the period of commutation, the diodes isolate the capacitors from the load in order to prevent the energy stored in the capacitors from discharging unnecessarily after the completion of the commutation, thereby assuring the next commutation operation.

Figure 2A:
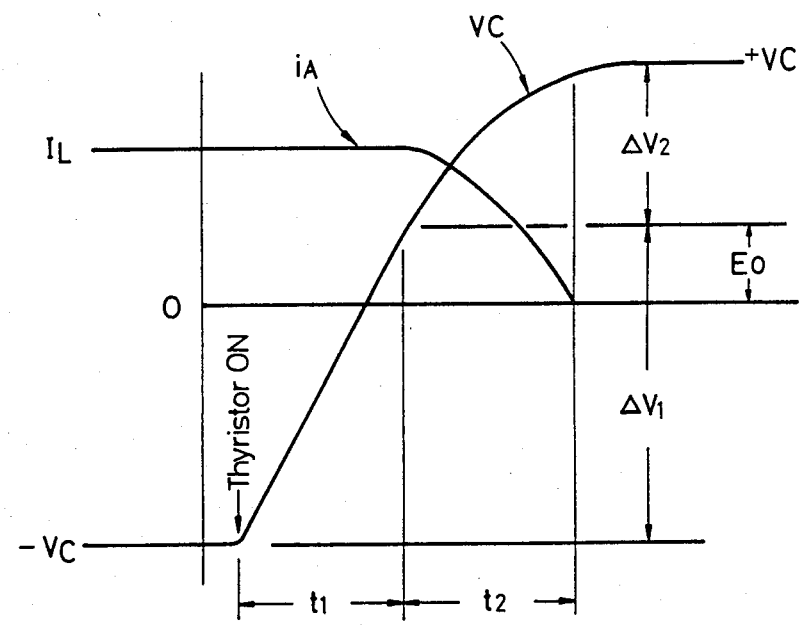
FIG. 2A shows a schematic diagram of the capacitor voltage and the motor terminal current during the commutation period of the circuit as illustrated in FIG. 1.
Figure 2B:
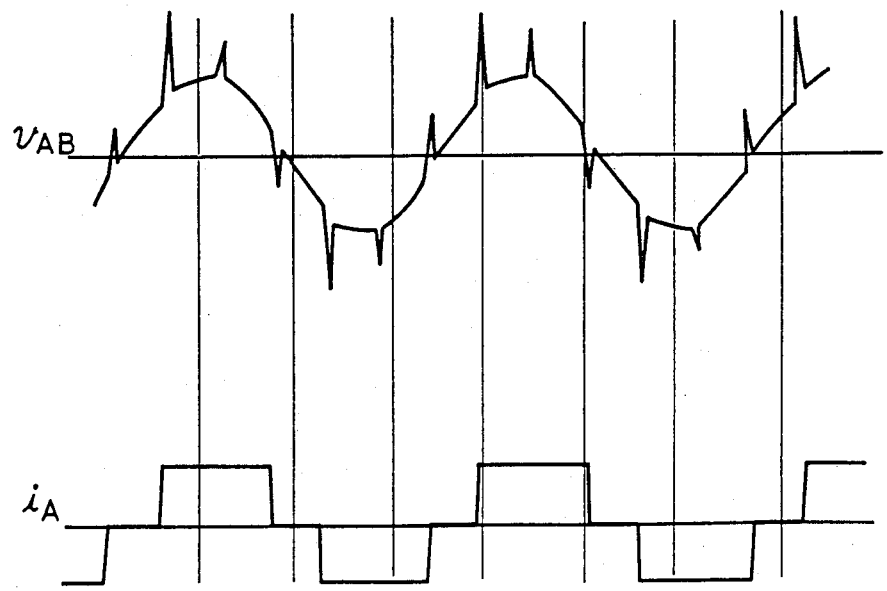
FIG. 2B shows a schematic waveform diagram of the line-to-line voltage and the motor terminal current during the commutation period of the circuit as illustrated in FIG. 1.

FIG. 2A shows the variations in the capacitor voltage $V_c$ and terminal current $i_A$ of a motor during a mode of the commutation in the ASCI system. In FIG. 2A, the period of the commutation can be divided into the period $t_1$, and the period $t_2$. The period $t_1$ is the time required for the energy absorbed in the capacitor during the previous cycle to be discharged and charged by the DC source current, and the period $t_2$ is the time required for the capacitor to be charged attributable to the reactive resonance which occurs due to the interaction of the capacitor and the leakage inductance of the motor. In fact, the total commutation period becomes long unnecessarily due to the fact that during that period $t_1$ only the energy stored in the capacitor by DC current is discharged. The period $t_1$ occupies the larger portion of the total commutation period during light load operation of the motor, thereby resulting in a most serious restraint on the upper limit operating frequency. However, the period $t_1$ of the ASCI system is an important period wherein the OFF and the ON states can be exchanged with each other, and the current exchange between lines of the motor occurs in the period $t_2$. The energy stored in the leakage inductors Lea, Leb, Lec, in the form of the current, is changed into the voltage of the capacitor in the period $t_2$. Thus, the capacitor can recovery discharge the energy stored during the previous cycle during the period $t_1$ and exchange the current between the lines through the energy exchange with the leakage inductors during the period $t_2$. In a word, the commutation of the ASCI system can be expressed by the function of the capacitor, as "the recovery discharge occurs first and occurs line current commutation the last" (or, simply "recovery first and commutation last"). FIG. 2B shows the waveforms of the line current and the line voltage during the continuous commutation.

One of the most important problems of the ASCI system is the high voltage stresses applied to the thyristors, diodes and motor terminals. A direct cause of the peak voltage stress is the peak voltage value at both sides of the capacitor, which is a function of the load condition, capacitance and leakage inductance of the motor. The magnitude of the capacitance affects the selection of the upper limit operating frequency, which is determined by the no-load condition, that is, when the DC current is minimum. On the other hand, the capacitor value should be selected to be as small as possible in order to raise the upper limit of the operating frequency since the maximum peak voltage is determined by the maximum load condition, that is, when the DC current is maximum, but in this case the peak voltage of the capacitor becomes high. Therefore, in the ASCI system, since the upper limit operating frequency conflicts with the withstand voltage of the capacitor, that is, the maximum high voltage stress applied to the thyristor, a reasonable compromise should be effected in an actual case.

Figure 3A:
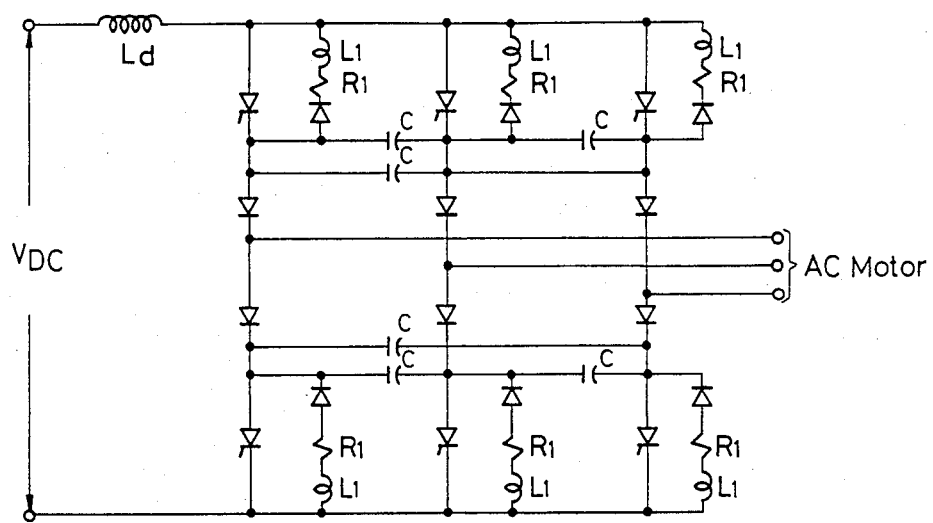
FIGS. 3A and 3B show the schematic circuit diagrams to overcome the drawbacks of the inverter of FIG. 1.
Figure 3B:
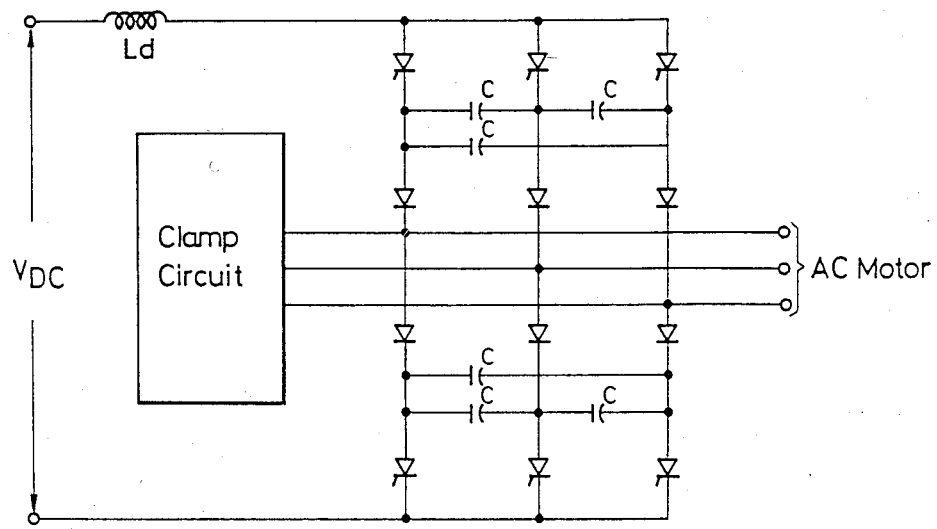

FIGS. 3A and 3B show two kinds of solutions to the above-mentioned problems of the ASCI system. FIG. 3A shows a circuit wherein a diode, resistance $R_1$ and inductance $L_1$ connnected in series with each other are connected in parallel with of both side of the power line in reverse manner. This system attempts to increase the range of the upper limit operating frequency by adding a circuit comprising $L_1$ and $R_1$ to the discharge circuit of the capacitor in order to reduce the discharge period. However, this system has the drawback that total efficiency is decreased due to the electric power loss caused by the resistance $R_1$ inserted in the circuit for preventing the capacitor from overcharging as the commutation repeats.

Figure 4A:
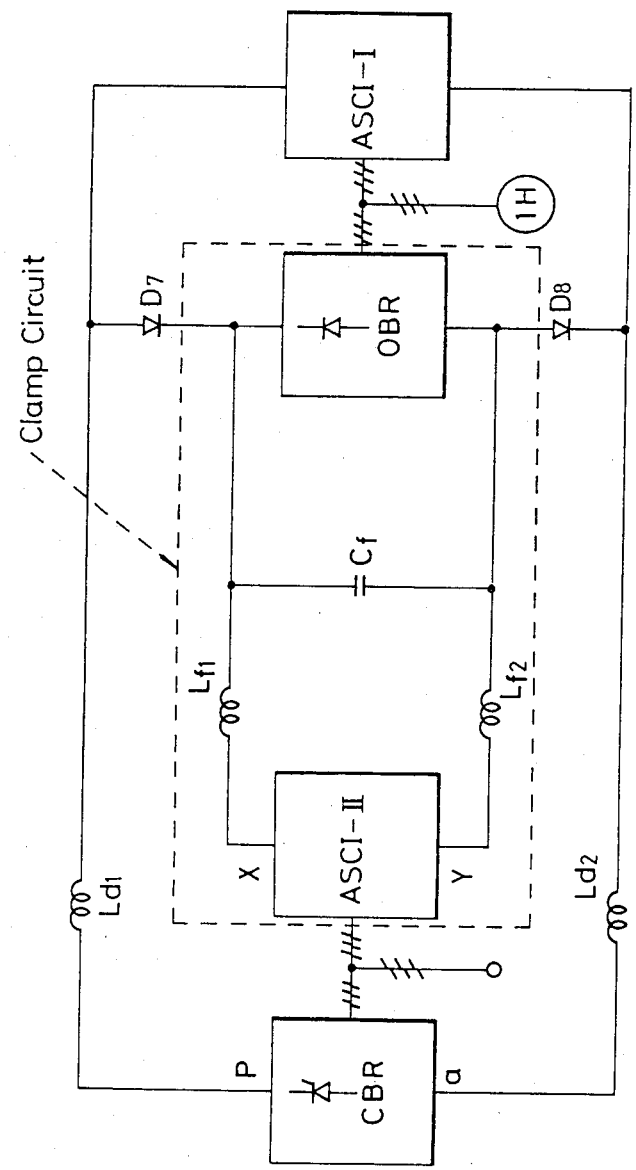
FIGS. 4A and 4B show the detailed circuit diagrams of FIG. 3B.
Figure 4B:
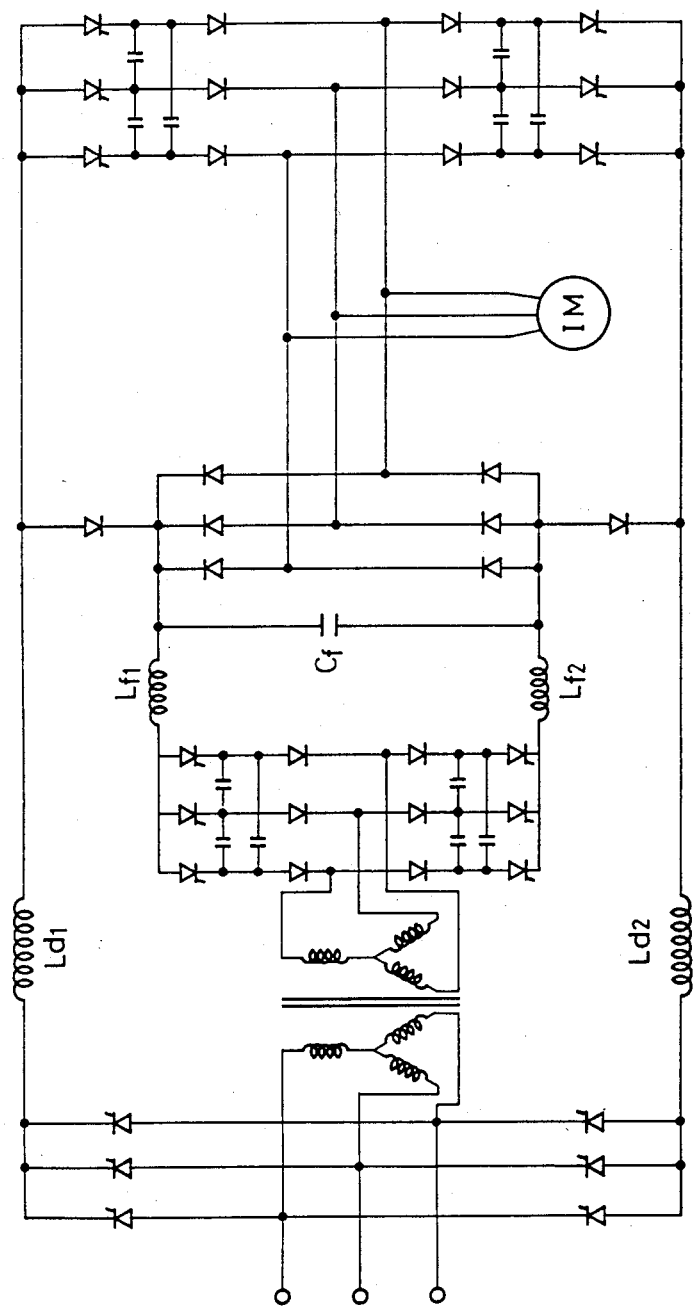
Figure 5A:
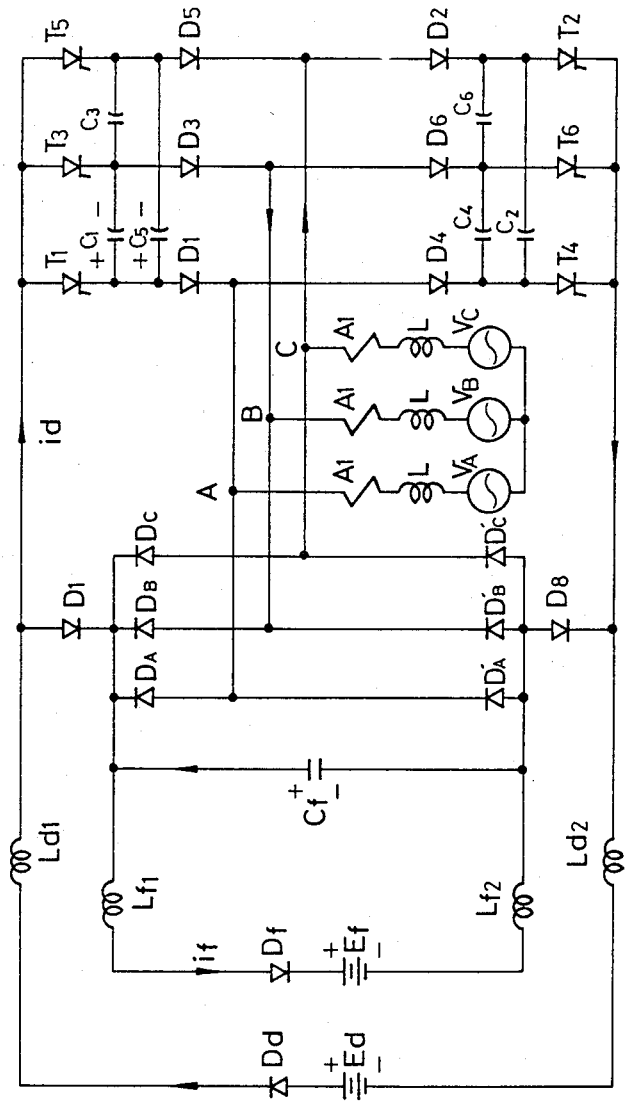
FIG. 5A shows a circuit diagram for the electrical analysis of FIG. 4B.
Figure 5C:
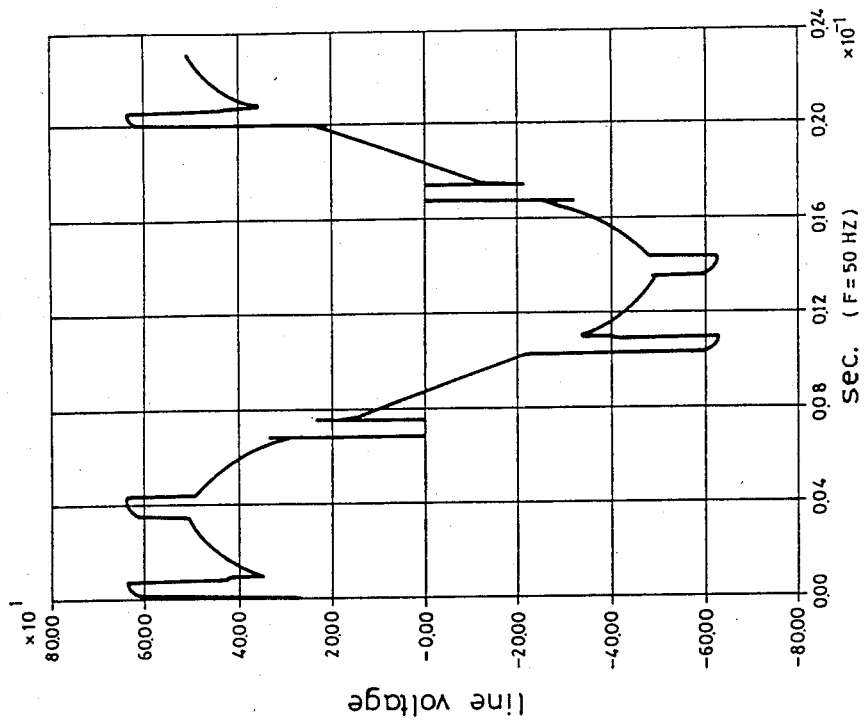
FIG. 5C shows a waveform diagram of the line voltage of FIG. 4B.
Figure 5B:
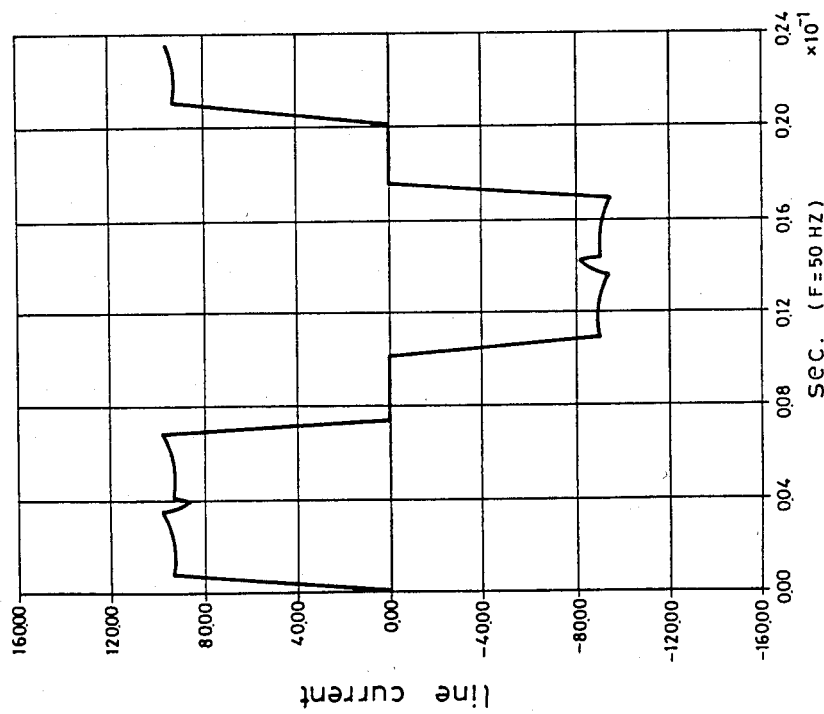
FIG. 5B shows a waveform diagram of the line current of FIG. 4B.

FIG. 3B shows a circuit wherein a clamp circuit is added to the ASCI system and that is intended to increase the upper limit operating frequency and the efficiency. This technique was disclosed in R. Palaniappan, "Voltage Clamping Circuits for CSI/IM Drives" (IEEE Trans. of Ind. Appl., IA-Vol. 21, No. 2, March, April/1985). In this system, the capacitor is selected to perform function of the commutation of the thyristor only during the period of the commutation, and the peak voltage of the capacitor is designed to be limited to the voltage of the clamp circuit, by which the leakage energy is absorbed. Thus, the clamp circuit limits the voltage and returns the commutation energy, and the detailed circuit thereof is shown in FIGS. 4A. and 4B. FIG. 5A shows a circuit diagram for the electrical analysis of FIG. 4B, and FIGS. 5B and 5C show the waveforms of the line current and the line voltage. From the foregoing it can be seen that this system can limit the peak voltage stress and obtain quite a wide range of the operating frequency, but has the drawbacks in that the clamp circuit is complex, bulky and expensive.

The present invention proposes a Simultaneous Recovery Commutation Inverter (SRCI) characterized in that the commutation of the line current is performed at the same time as the recovery discharge of the capacitor energy unlike the prior art ASCI systems. The new inverter of the SRCI system of the present invention solves the problem of the prior art ASCI system wherein the total period of the commutation becomes long due to the fact the period of the recovery discharge and the period of the line current are separately operated. In addition, the SRCI system of the present invention has the merits over the prior art ASCI system such as a wider range of the upper limit operating frequency, a lower voltage stress on the semiconductor elements and the motor terminal and higher reliability.

Figure 6A:
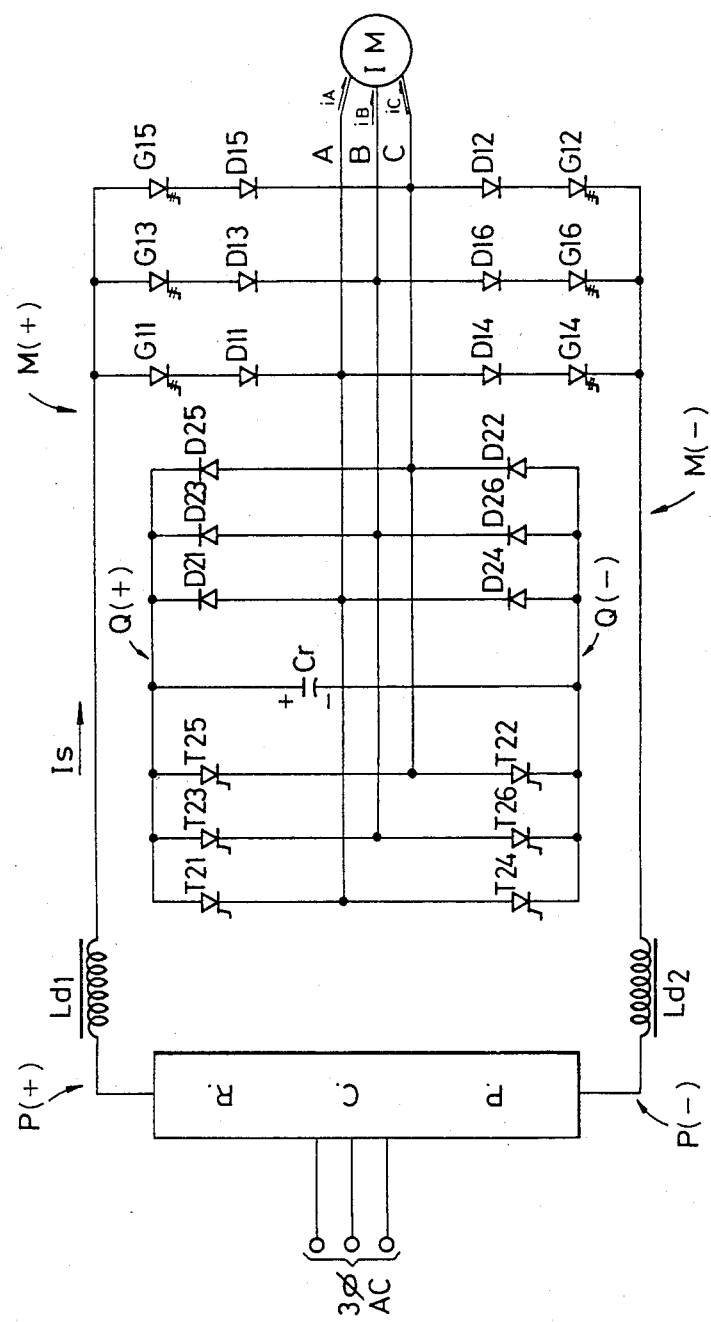
FIG. 6A shows a basic circuit diagram of the present invention.

FIG. 6A shows a basic circuit diagram of the present invention and FIG. 6B shows snubber circuits comprising inductors, resistors, capacitors and diodes connected in series or parallel to each element for safe switching of each element. In FIG. 6A, G11 to G16 denote GTO (gate-turn-off) thyristors, and diodes D11 to D16 are connected in series to the corresponding GTO thyristors, for protecting the GTO thyristors from reverse voltage break down during commutation and/or regenerative operation of the inverter. Of course, the GTO thyristors can be replaced with transistors or MOS, devices and diodes D11 to D16 can be removed in case switching elements having high reverse voltage breakdown endurance are used. Diodes D21 to D26 are connected in reverse parallel with thyristors T21 to T26, respectively. Phase Controlled Rectifier PCR changes the input three phase AC voltage to the output variable DC voltage P(+), P(−).

Between the DC outputs P(+), P(−) and the busses M(+), M(−) which are the D.C. source line connected to the respective GTO inverters G11–G16 at both sides of the line, inductors Ld1, Ld2 are respectively inserted for the purpose of providing the electric current source and ripple filter, respectively. The three A,B,C of an AC motor IM connected to the GTO inverters are connected in parallel with an auxiliary inverter comprising diodes D21–D26 and thyristors T21–T26, and a DC capacitor $C_r$ is connected across both sides of an auxiliary DC source bus Q(+), Q(−).

In the circuit of the present invention constructed as above, a process of commutation in which the current path is changed from terminal A to terminal B is shown in FIG. 7 in connection with the ON/OFF control of the GTO's or thyristors. The PCR of the input side is shown as an equivalent circuit DC source main inverter switch, and the transition in which an ON sate of main inverter switch G11, D11 is changed to an ON state of main inverter switch G13, D13 is shown. In the mode shown in FIG. 7A, the current flows in the following mode:

M(+)→G11, D11→terminal A→IM→terminal C→D12, G12→M(−)

Figure 7A:
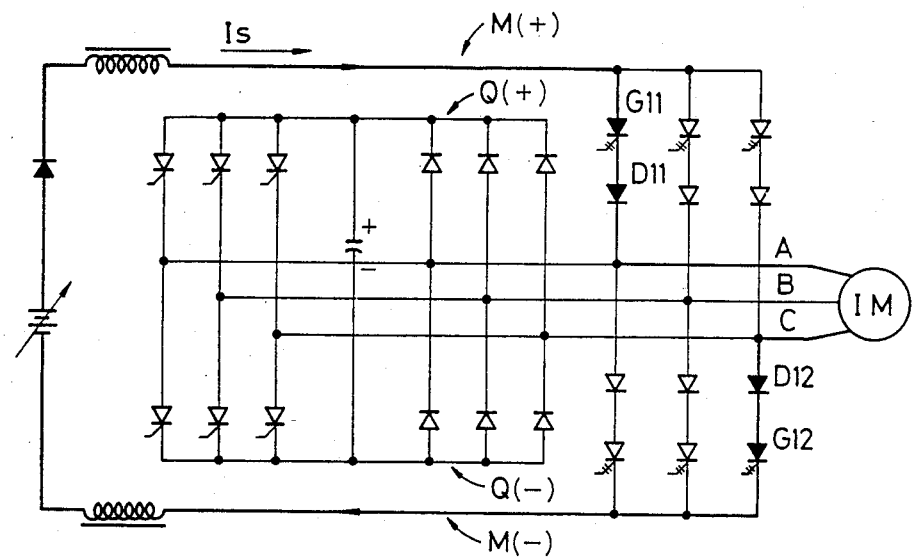
FIGS. 7A, 7B, 7C, and 7D show the schematic circuit diagrams of four commutation modes in FIG. 6.
Figure 7B:
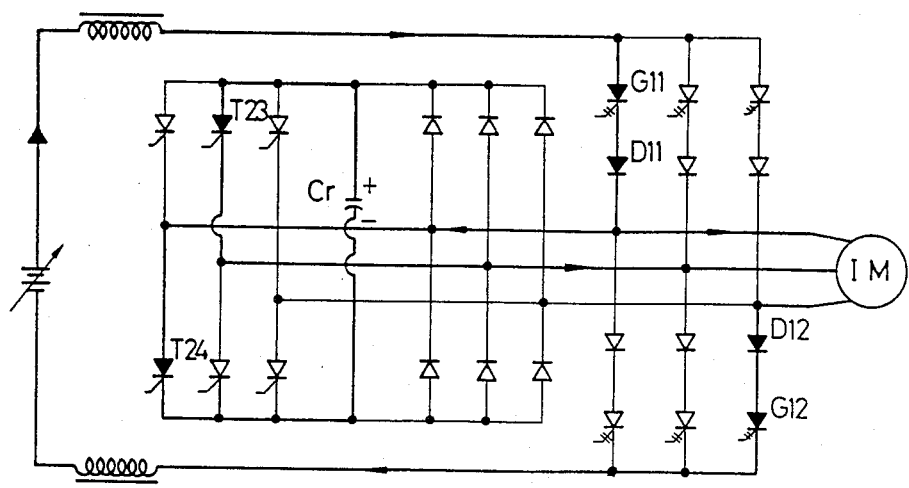

When the thyristors T23 and T24 of the auxiliary inverter are turned-on simultaneously, the current at terminal A begins to decrease and the current at terminal B begins to increase as shown in FIG. 7B. At this time, the increasing and decreasing rates of the currents at both terminals A and B are identical and the current at terminal C is constant because the current at bus (M+) is substantially constant. Such a change of the current occurs because the DC voltage on both sides of capacitor $C_r$ is applied to both sides of terminals B, A. In the mode of FIG. 7B, the energy of both sides of capacitor $C_r$ is recovered and discharged, and the commutation from terminal A to B is performed simultaneously therewith. The electric potential of both sides of capacitor $C_r$ in the normal state depends on the period of the mode shown in FIG. 7B and is a function of the load current, which will be described in detail later. The waveforms of the current and the voltage of the circuit are shown in the upper part of FIG. 8.

Figure 7C:
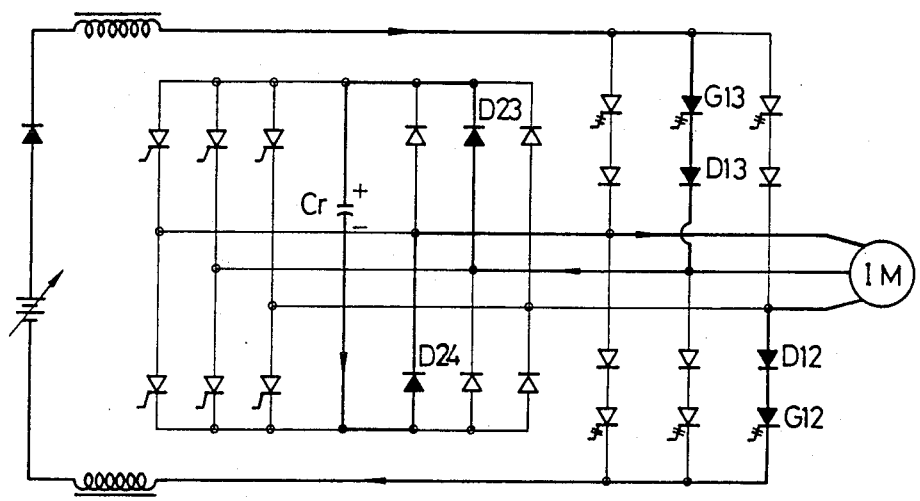

The time when the mode of FIG. 7B is finished and the mode of FIG. 7C is begun can be controlled freely and is determined by the time main inverter GTO thyristor G11 is turned off and main inverter GTO thyristor G13 is turned on. In the normal state, the currents at terminals A and B at the commutation switchover starting point are almost the same, and that is further characteristic of the SRCI according to the present invention. In the mode of FIG. 7C, the auxiliary inverter thyristors T23, T24 are turned off as soon as the auxiliary inverter diodes D23, D24 are biased on. Consequently, the current flows in the following mode:

BUS M(+)→G13,

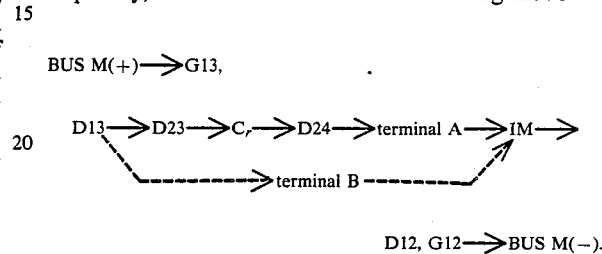

D12, G12→BUS M(−).

As compared with the mode of FIG. 7B, one of the important differences is the fact that the direction of the current of the capacitor $C_r$ has changed. Something in common is the fact that the polarity of terminals A and B are the same. Since the voltage at both these terminals of the motor is the same as the voltage of both sides on capacitor $C_r$ as in the mode of FIG. 7B, the current at terminal A, subsequent to the mode of FIG. 7B, decreases to zero and the current at terminal B increases to DC source current $I_s$. Therefore, the current at this time charges the capacitor $C_r$. The period of the mode of FIG. 7C becomes substantially the same as the period of the mode of FIG. 7B, and the voltage on capacitor $C_r$ maintains a constant value for a constant load current under the normal state because the recovery discharged quantity in the mode of FIG. 7B is the same as the charged quantity in the mode of FIG. 7C.

The completion of the mode of FIG. 7C occurs when the current at terminal A is shut off and the current at terminal B is the same as that of the bus M(+), and the current flows in the following mode:

BUS M(+)→G13, D13→terminal B→IM→terminal C→D12, G12→BUS M(−).

Figure 7D:
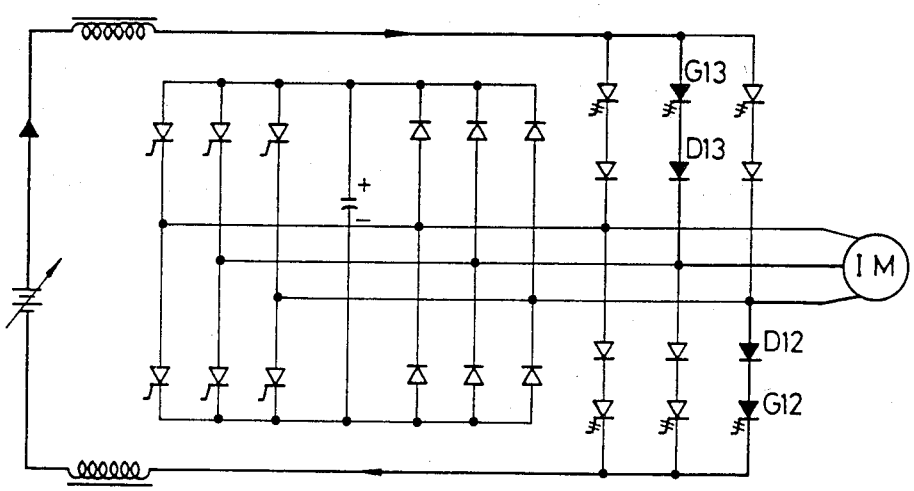

Eventually, the operating mode changes into the mode as shown in FIG. 7D.

Figure 8:
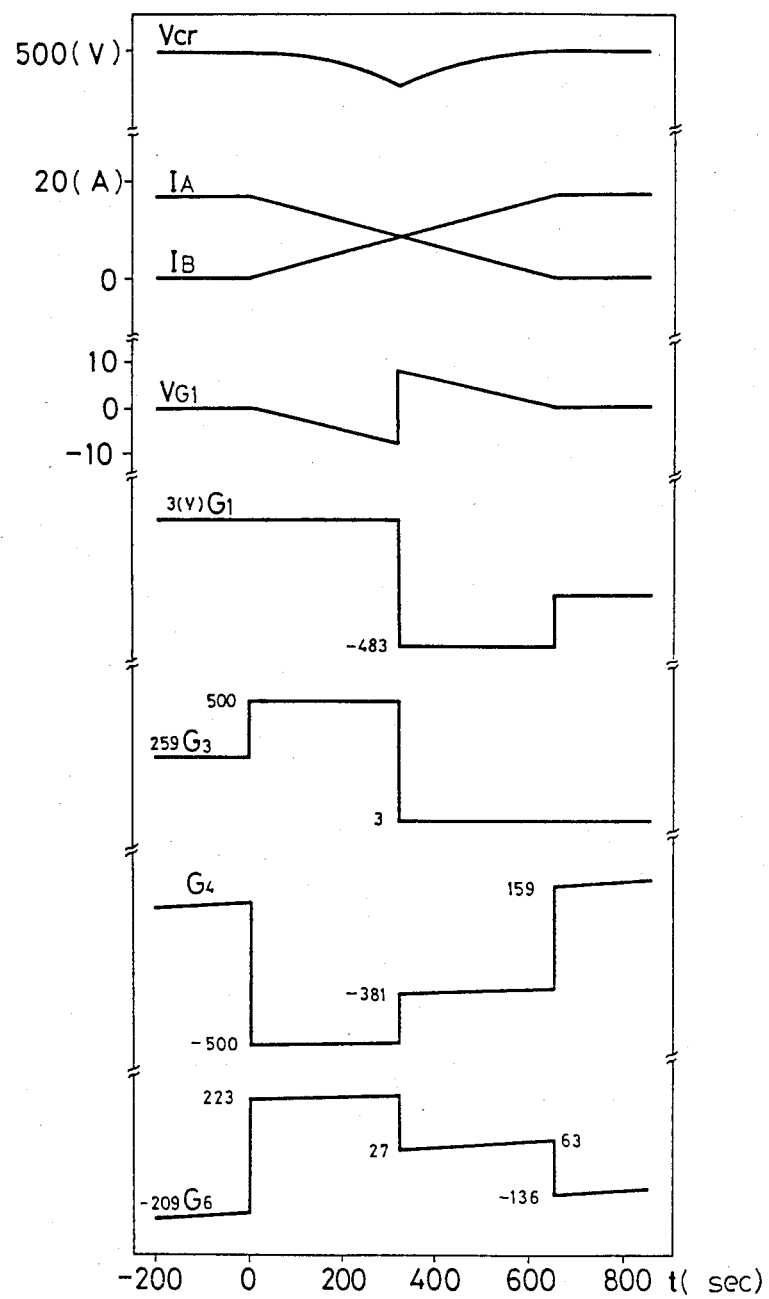
FIG. 8 shows the waveforms of the voltage and the current corresponding to respective modes in FIG. 7.
Figure 9:
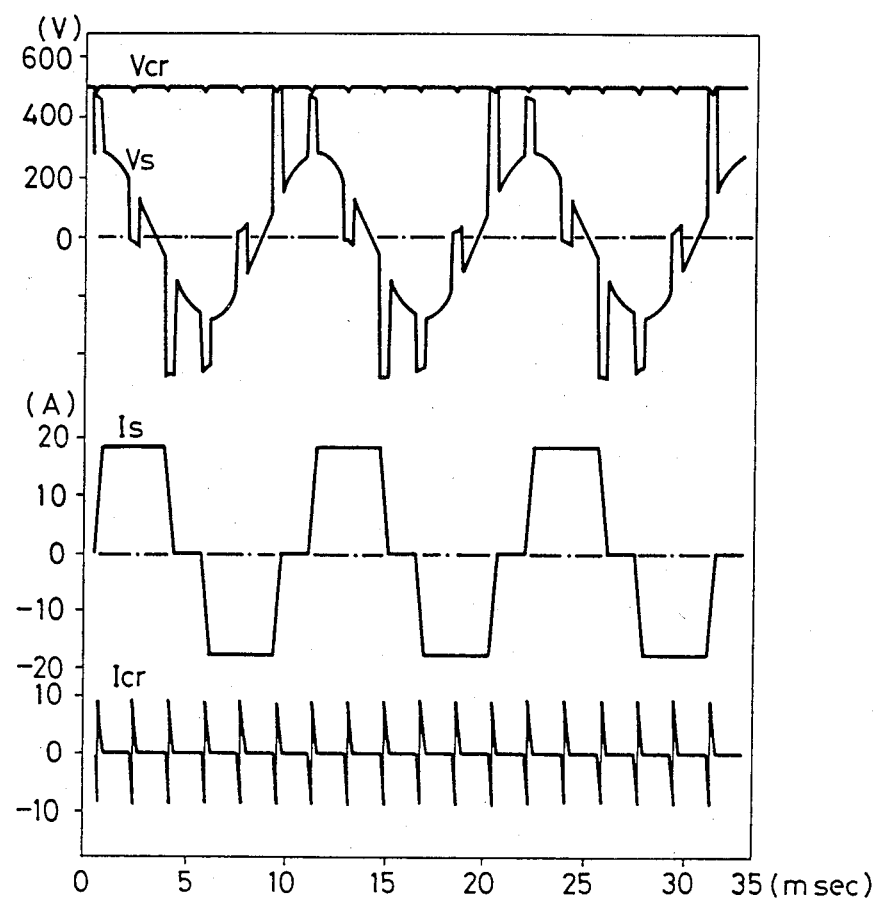
FIG. 9 shows the waveforms of the voltage and current of the capacitor and those of the motor terminal of the inverter in FIG. 6.

As mentioned above, we have discussed the commutation modes of the SRCI for the commutation between the two terminal A, B of the motor. The waveforms of the current and the voltage during the commutation modes are shown in FIG. 8, and the waveforms of the current and the voltage of the motor and the capacitor are depicted in FIG. 9.

The characteristics of the commutation operation of the above mentioned SCRI are, compared with those of the prior art ASCI, as follows:

| Commutation period | ASCI | SRCI |
|---|---|---|
| The first half period | 0% commutation<br>100% recovery discharge | 50% commutation<br>50% recovery discharge |

| Commutation period | ASCI | SRCI |
|---|---|---|
| The latter half period | 100% commutation 100% reverse charge | 50% commutation 50% recharge | wherein, the terms "commutation" means the commutation of the current between the two terminals of the motor, and the terms "recovery" "discharge" and "charge" relate to the commutation capacitor. The first half period of the commutation in the ASCI corresponds to the period to $t_1$ in FIG. 2A, and the latter half period the period $t_2$. The first period of the commutation in the SRCI corresponds to the mode of FIG. 7B, and the latter half period to the mode of FIG. 7C. The characteristics of the SRCI are, compared with those of the ASCI, as follows:

(1) The variation in the voltage on the capacitor is very small.

Since the voltage on the capacitor of the ASCI system varies from $+V_c$ to $-V_c$, an ASCI system requires the AC capacitor for high voltage and high frequency, while the SRCI system requires only a small cheap capacitor rated for DC since the capacitor voltage in the SRCI system varies only slightly in the states of being discharged and recharged in a constant direction.

(2) The voltage stresses on the motor and the semiconductor elements is very low.

In general, the SRCI system can reduce by half the voltage stresses applied to the terminals of the motor and to the semiconductor elements as compared with the similar ASCI system.

(3) It is possible to operate the SRCI system over a wide region.

The SRCI system can be smoothly operated over a region twice as wide compared with the ASCI system. Besides, the SRCI system has other characteristics such as high efficiency, low cost, high reliability, etc., which will be described below in greater detail.

Figure 10:
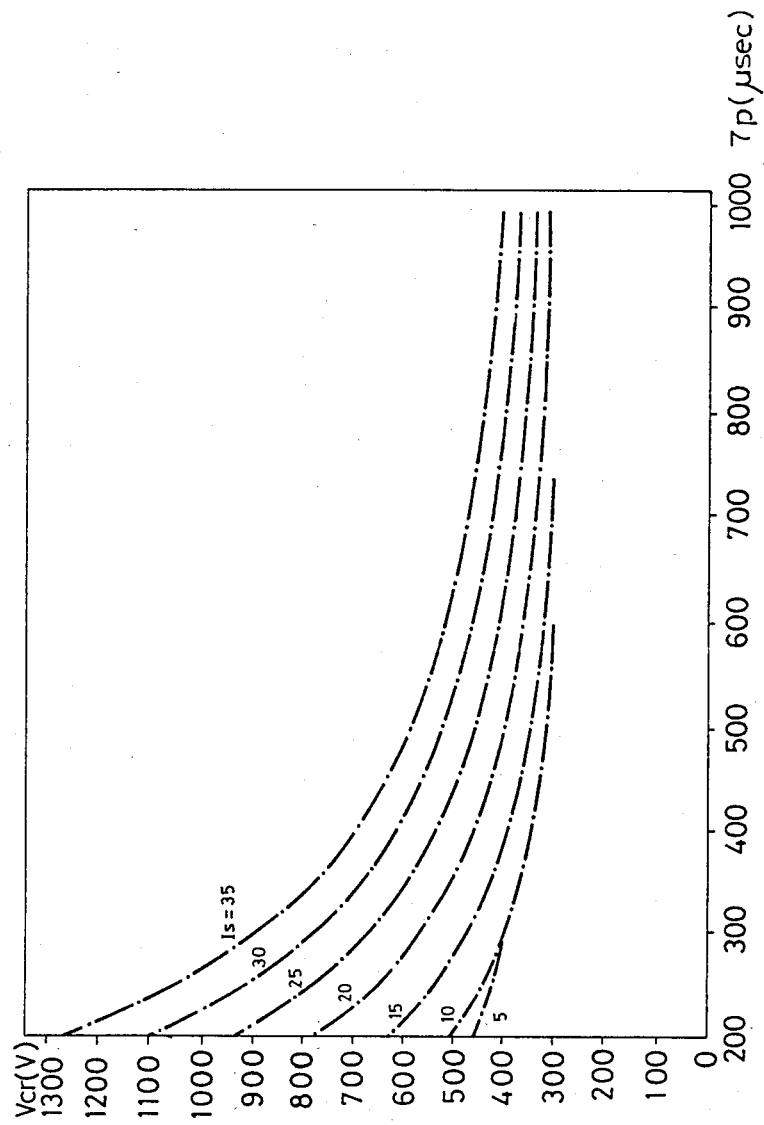
FIG. 10 shows the voltage variations according to the variations of period $\tau p$ of the mode of FIG. 7B for several electric source current $I_s$.

FIGS. 10 to 16, inclusive, are graphs showing the characteristics of the SRCI system of the present invention, which were prepared for the motor having the following standards:

Rated output: 5 horse power (Induction motor, 4 poles)
Rated voltages: 3 phases 220 V, 60 Hz
Rated revolution: 1,735 r.p.m.
Rated load current: 14.0 A
  Calculated at DC side $I_s$=18.0 A
Rated magnetizing current: 4.0 A
  Calculated at DC side $I_s$=5.1 A
Magnetizing inductance: 116 mH
Leakage inductance: 7 mH FIG. 10 shows that the voltage Vcr on the capacitor varies according to the period $\tau p$ of the mode of FIG. 7B when the DC curent $I_s$ varies from 5 Amps to 35 Amp. The common characteristics are in fact that $V_{cr}$ is decreased as $\tau p$ is increased, and $V_{cr}$ is increased as $I_s$ is increased for the given value of $\tau p$.

Figure 11:
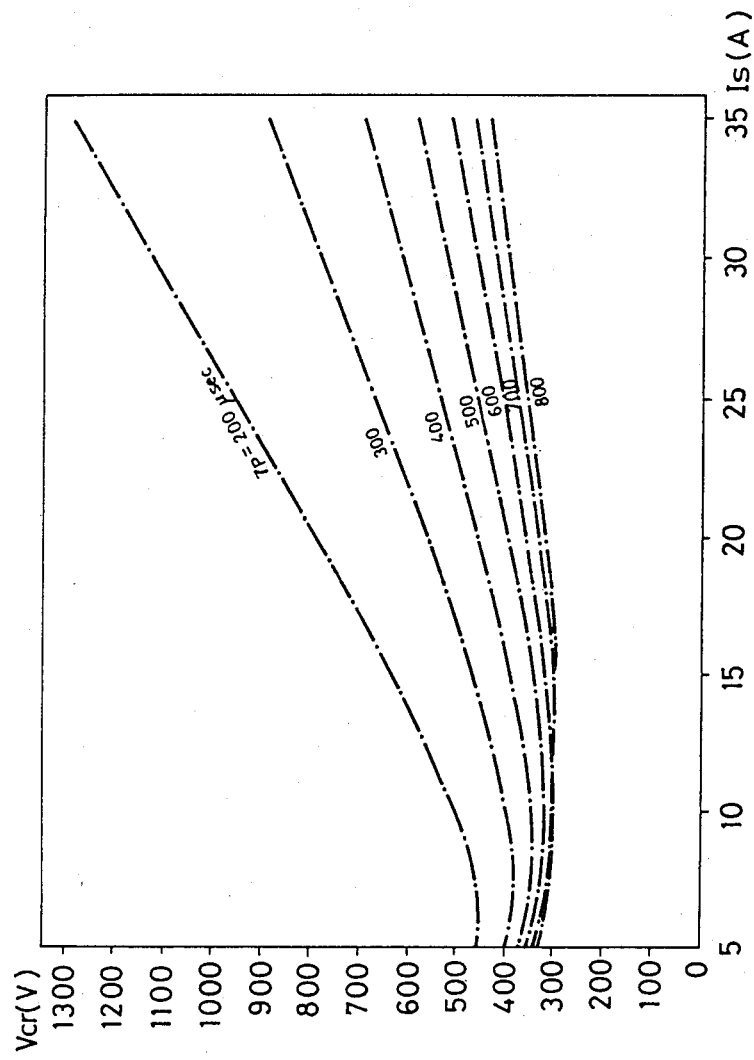
FIG. 11 shows the voltage variations according to the variations of the electric source current $I_s$ for several periods $\tau p$ of the mode of FIG. 7B.

FIG. 11 shows the same characteristics as those of FIG. 10 in another form, wherein the voltage $V_{cr}$ on the capacitor varies as the current $I_s$ of the bus M(+) varies when the period $\tau p$ of FIG. 7B varies from 200 sec. to 800 sec. This graph shows that $V_{cr}$ increases in almost constant gradient as $I_s$ increases from the given value of $\tau p$.

Figure 12:
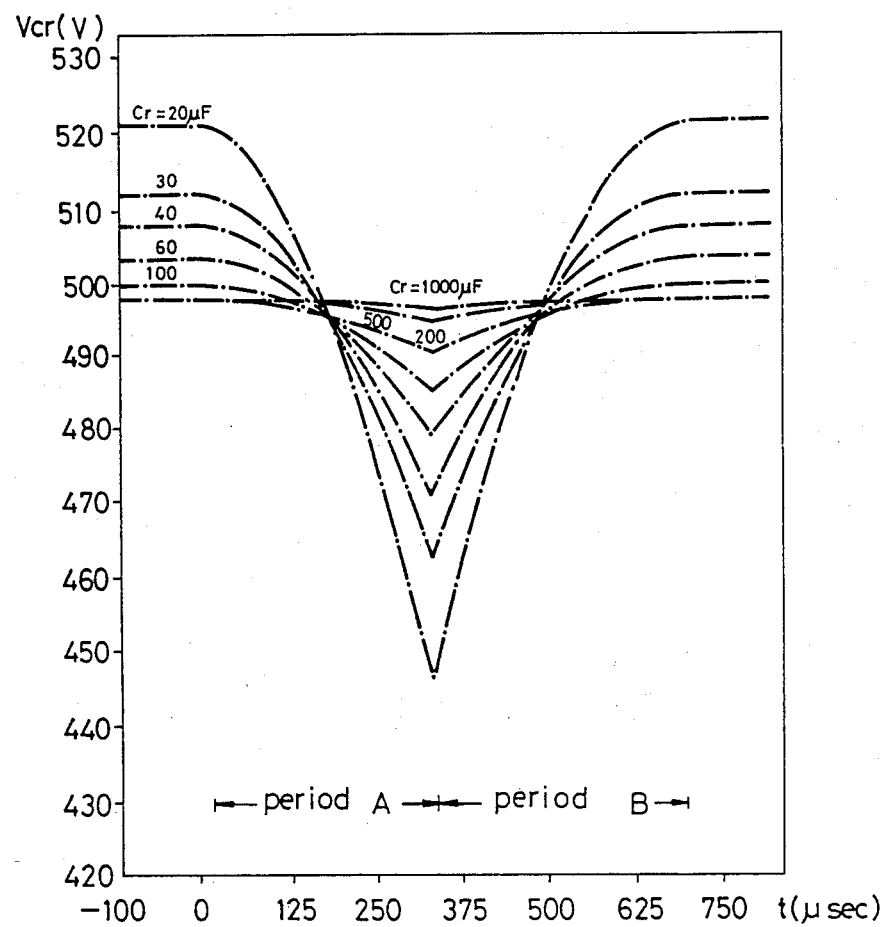
FIG. 12 shows the waveforms of the voltage at both sides of $C_r$ for several $C_r$ value in case $\tau p$ and $I_s$ in FIG. 11 are given.

FIG. 12 shows the waveforms of the capacitor voltage $V_{cr}$ for the capacitance value $C_r$ during the commutation period under the state wherein the load current is 18 Amps and $\tau p$ is 350 micro sec. From FIG. 12, it is apparent that the period $\tau p$ of the recovery discharge period during the mode of FIG. 7B is substantially identical to that of the recharge of FIG. 7C, and the ripple (or voltage variations) of $V_{cr}$ varies as the value $C_r$ of the capacitance varies, but at the ending period of the mode of FIG. 7C, is maintained at the same capacitor voltage $V_{cr}$ as at he starting point of the mode of FIG. 7B. The reason is, as described above, that the quantity of the recovered discharge energy is the same as that of the recharged energy under the normal state.

Figure 13:
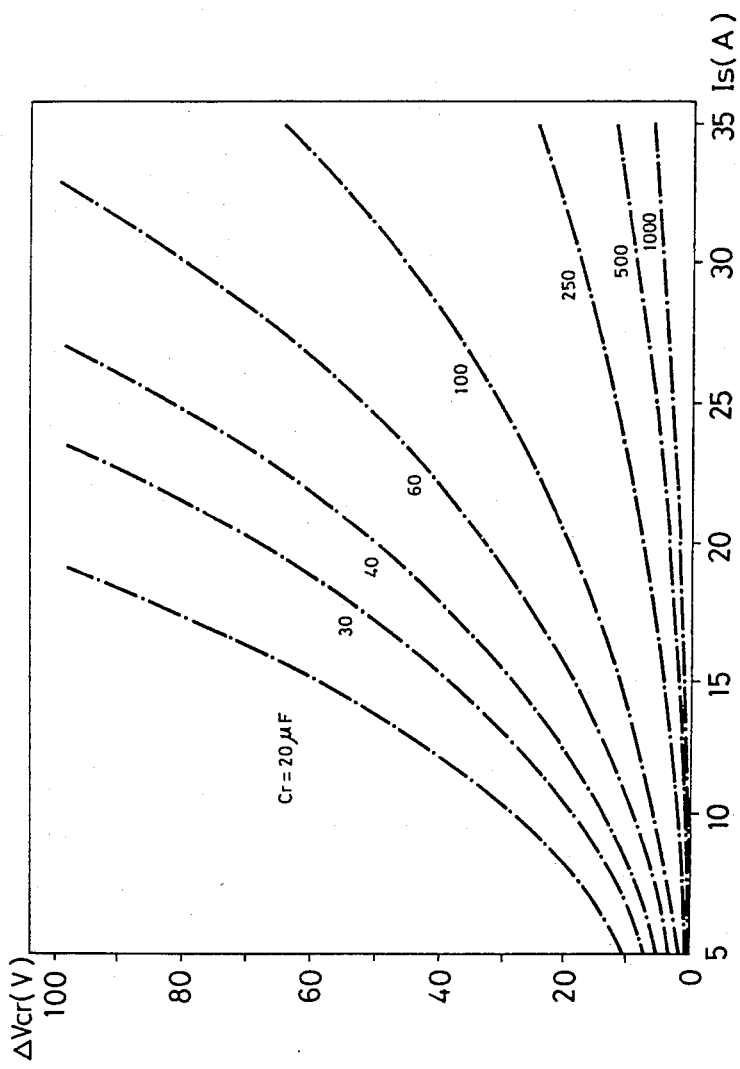
FIG. 13 shows the magnitudes of the peak voltage ripples at both sides of $C_r$ which are given as a function of the current $I_s$ according to the magnitude of capacitance $C_r$.

FIG. 13 shows in more detail that the ripple of $V_{cr}$ varies depending on the size of the capacitance $V_{cr}$. That is, the ripple of $V_{cr}$ is shown as a function of the given capacitance values (20 $\mu$F-1000 $\mu$F) as the current $I_s$ at the bus M(+) is varied (wherein, the "term ripple of $V_{cr}$" means the difference between the maximum value and the minimum value). Of course, this graph is the result obtained from the normal state, and shows that the ripple increases linearly as the current $I_s$ increases. If the value of $C_r$ is more than 40 $\mu$F, although $I_s$ is increased to 30 Amp, the ripple is lesser than 50 Volt for the voltage $V_{cr}$ of 500 Volt.

Figure 14:
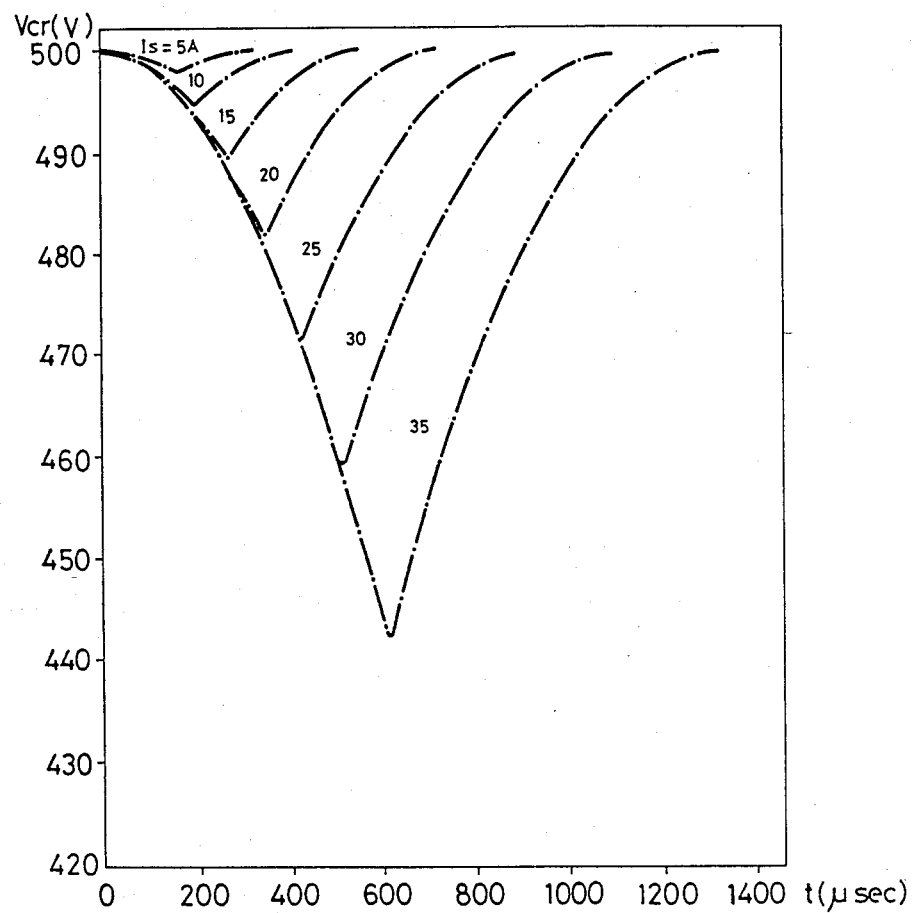
FIG. 14 shows the waveforms of the voltage at both sides of $C_r$ when the period $\tau p$ is replaced with a function of the current $I_s$.

FIG. 14 shows the different modes from those of FIG. 12. It shows the waveforms of the capacitor wherein the period $\tau p$ of the recovery discharge is varied such that the value of $V_{cr}$ is coincided with the initial value of the commutation at the state of completion of the commutation as the current at the bus M(+) side varies when the value of capacitance $C_r$ is given as $\phi \mu F$. If $\tau p$ is constant, the value of $V_{cr}$ varies as a function of $I_s$ as shown in FIG. 11, but if $\tau p$ is varied, the value of $V_{cr}$ is maintained constant irrespective of the variation of $I_s$. This is very important and allows the peak voltage stresses on the motor terminal and the semiconductor elements to be maintained at a constant value.

Figure 15:
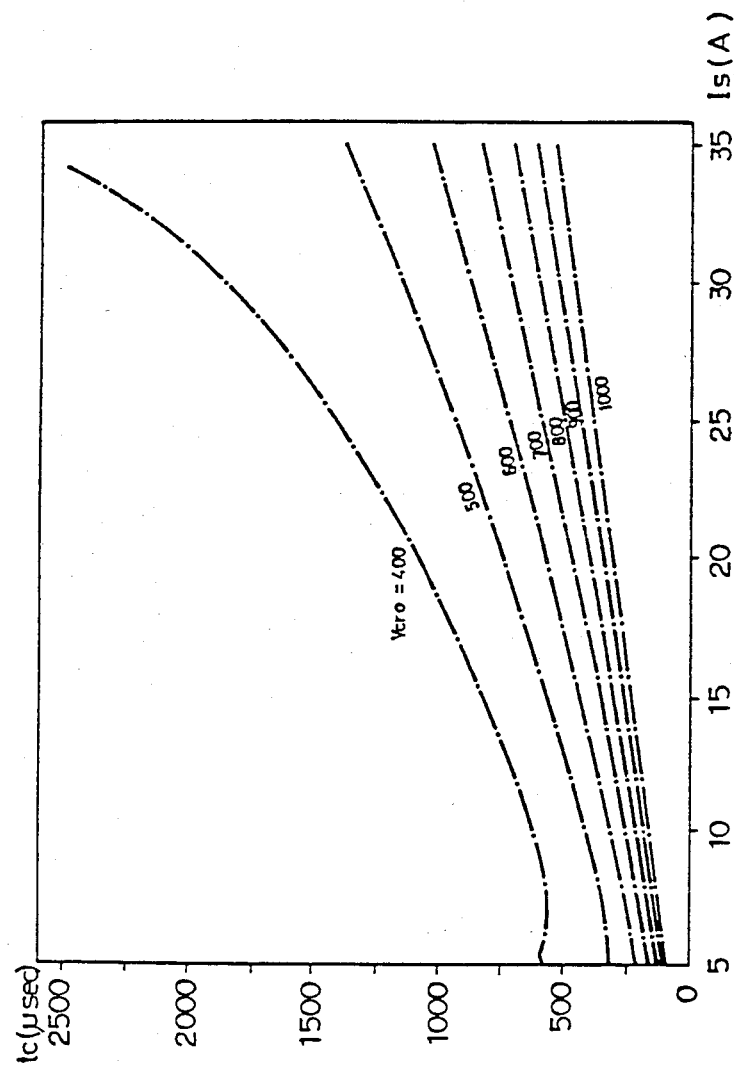
FIG. 15 shows total commutation periods $t_c$ expressed as a function of the current $I_s$ when the voltage at both sides of $C_r$ is intended to be maintained constant under the normal state.
Figure 16:
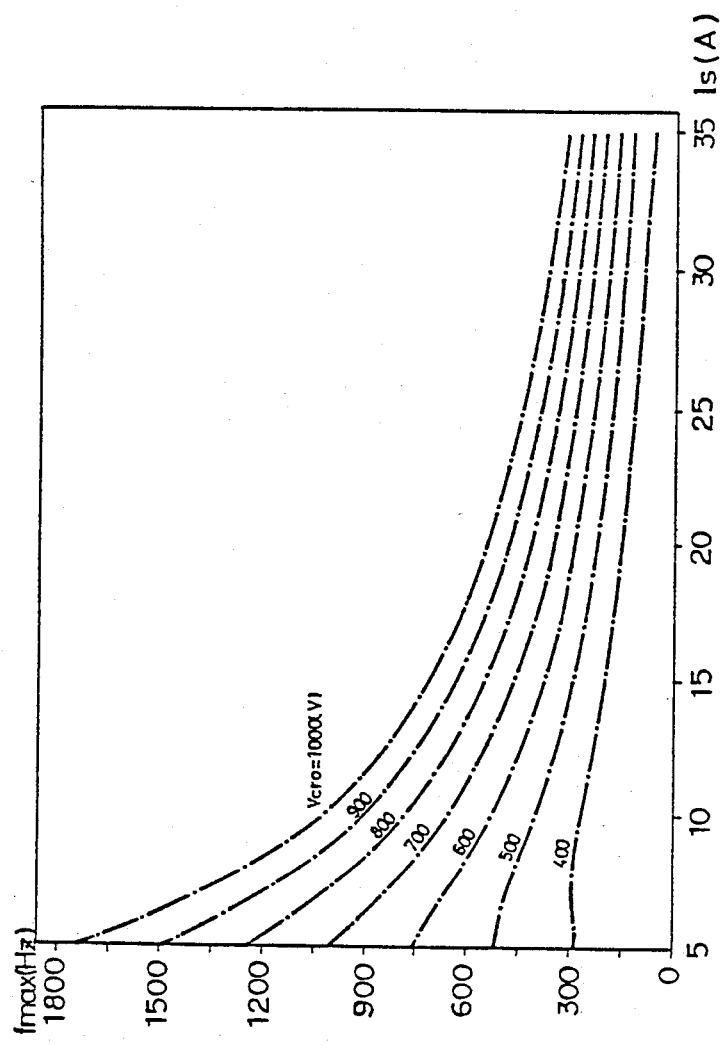
FIG. 16 shows the maximum operating frequencies expressed as a function of the current $I_s$ when the maximum peak voltage $V_{cro}$ of the capacitor $C_r$ is limited to given values.

FIGS. 15 to 18, inclusive, are graphs comparing the relation between the voltage stresses and the maximum operating frequency of the SRCI system of the present invention with those of the prior art ASCI system. FIGS. 15 and 16 relate to the SRCI system of the present invention and FIGS. 17 and 18 relate to the prior art ASCI system. FIG. 15 shows the total commutation period ($t_c \simeq 2\tau p$) according to the variation of the current at the bus M(+) sidewhen the peak voltage stresses $V_{cro}$ are maintained at several constant values as shown in FIG. 14. As the commutation period $t_c$ becomes longer, the maximum operating frequency becomes lower, so that as the current $I_s$ at the bus M(+) side becomes higher, the maximum operating frequency becomes lower. FIG. 16 shows the maximum operating frequency for $I_s$, wherein as $V_{cro}$ increases, $t_c$ decreases and the operating frequency increases. The upper limit of the operable maximum frequency becomes lower as $I_s$ becomes higher or $V_{cro}$ becomes lower and, for example, becomes 160 Hz when Vcro is limited to 500 volts at the condition of 200% operation ($I_s$=36 A) of a 5 horse power motor.

Figure 17:
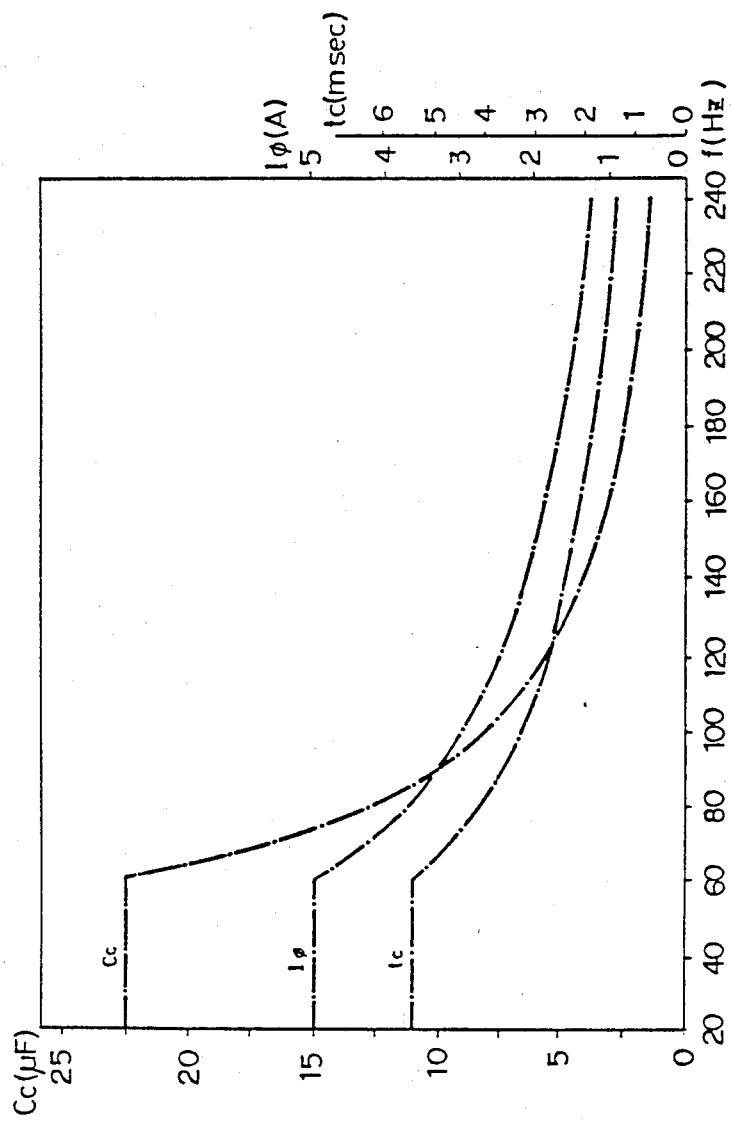
FIG. 17 shows the total commutation period $t_c$, capacitance $C$ and magnetizing current $I$ of the motor when the maximum operating frequency $f_m$ is varied for the prior art circuit in FIG. 1.
Figure 18:
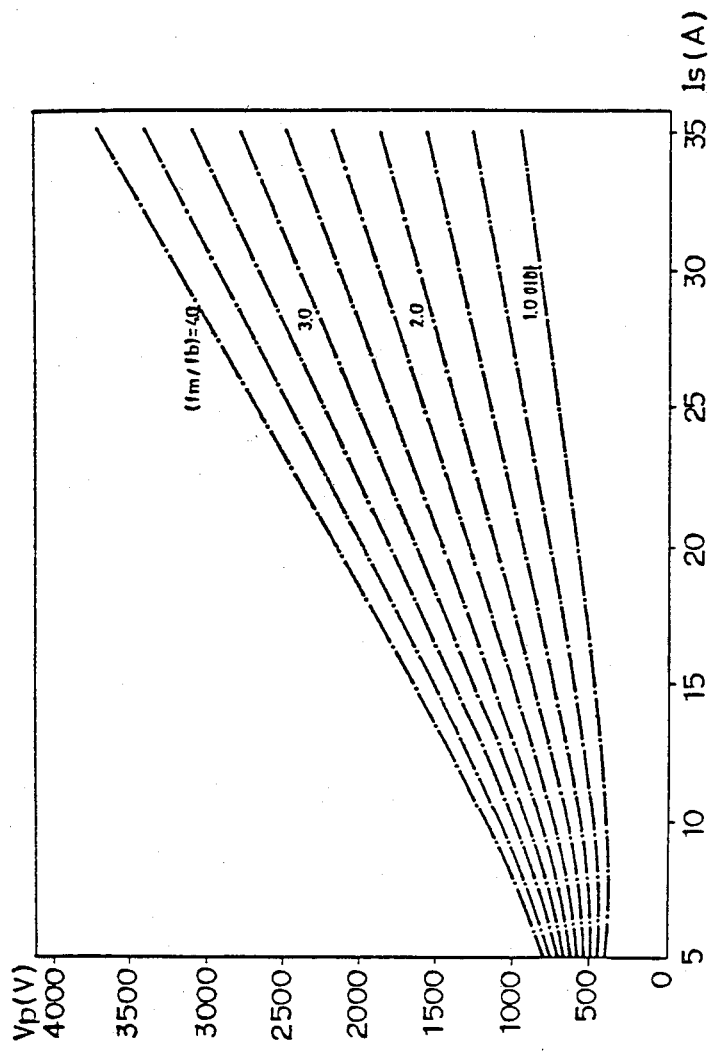
FIG. 18 shows the maximum peak voltage stresses expressed as a function of the load current for the given maximum operating frequency $f_m$ for the prior art circuit in FIG. 1.

FIGS. 17 and 18 show the characteristics of the prior art ASCI system wherein the upper limit operating frequency thereof is determined by the no load condition in contrast to the SRCI system. FIG. 17 shows the magnetizing current $I_\phi$, total commutation period $t_c$ and commutation capacitance value Cc as functions of the upper limit operating frequency $f_m$ beyond the rated frequency ($f_b=60$ Hz), wherein the magnetizing current $I_\phi$ decreases as the upper limit operating frequency $f_m$ increases when the effective value of the voltage between the terminals of the motor is limited to a constant maximum value, and the maximum capacitance Cc allowable under the circumstances are determined as functions of these values since the allowable commutation period $t_c$ is decreased in inverse proportion to the increase of $f_m$. Therefore, if the maximum frequency $f_m$ of operation operated is determined the, value Cc is obtained from FIG. 17, and the voltage stress on the capacitor as a function of the current is obtained from the value Cc. That is, the value Cc should be increased in order to decrease the voltage on the capacitor, but the maximum operating frequency becomes lower if the value Cc increases. As a result, if the upper limit of $f_m$ in the design condition is previously determined, the value Cc is determined therefrom. FIG. 18 shows the peak voltage stress at both sides of the capacitor C in the range of 100%–200% of the load current when the upper limit operating frequencies $f_m$ are given at several values for the above discussed induction motor.

The peak voltage stress at both sides of the capacitor relates to the voltage stress on the semiconductor switching elements and means the voltage stress between the motor terminals. One of the important parameters for comparing the current source inverters is the high voltage stress, considering the high cost of the semiconductor elements and the capacitor, and another is the operable maximum upper limit operating frequency. With this view, the characteristics of the SRCI system of the present invention and the prior art ASCI system will be easily understood by comparing FIG. 16 with FIG. 18. For example, in order to operate to a $f_m$ of 240 Hz at a 200% load ($I_s=36$ A), the capacitor voltage stress $V_{cro}$ of the SRCI system (FIG. 16) is about 790 volts while that of the prior art ASCI system (FIG. 18) is about 2900 volts (at and overload coefficient of 2). This demonstrates the merit of the SRCI system wherein the ratio of the voltage stress is 4:1, and it can operate at about 1000 Hz under the rated load when $V_{cro}$ is 790 volts.

Tables 1 and 2 show a comparison of the SRCI system of the present invention and the prior art ASCI system. These tables are prepared from the data selected from FIGS. 16 and 18, which are the results of the stimulation.

Table 1 shows the maximum operating frequency of the ASCI and the SRCI which can operate stably to a 100% and a 200% load, respectively, when the peak voltage stresses are limited to 500 volt, 750 volts and 1000 volts.

Table 2 shows the peak voltage stress to allowed by the ASCI and SRCI system under 100% and 200% load conditions in order to operate stably at 60 Hz, 120 Hz and 240 Hz, respectively.

The to merits of the SRCI system over the ASCI system will be apparent from Tables 1 and 2 below.

TABLE 1

| Peak voltage Stresses | $f_{max}$ at a 100% load (Id = 18A) | | $f_{max}$ at a 200% load (Id = 36A) | |
| --- | --- | --- | --- | --- |
| | ASCI | SRCI | ASCI | SRCI |
| 500 V | 70 Hz | 250 Hz | inoperable | 130 Hz |
| 750 V | 105 Hz | 420 Hz | 56 Hz | 220 Hz |
| 1000 V | 148 Hz | 580 Hz | 78 Hz | 320 Hz |

TABLE 2

| Load | $f_{max}$ | Peak Voltage Stresses | |
| --- | --- | --- | --- |
| | | ASCI | SRCI |
| 100% | 60 Hz | 460 V | 400 V or less |
| (Id = 18A) | 120 Hz | 850 V | 400 V or less |
| | 240 Hz | 1600 V | 490 V |
| 200% | 60 Hz | 800 V | 400 V |
| (Id = 36A) | 120 Hz | 1500 V | 480 V |
| | 240 Hz | 2900 V | 790 V |

Figure 19:
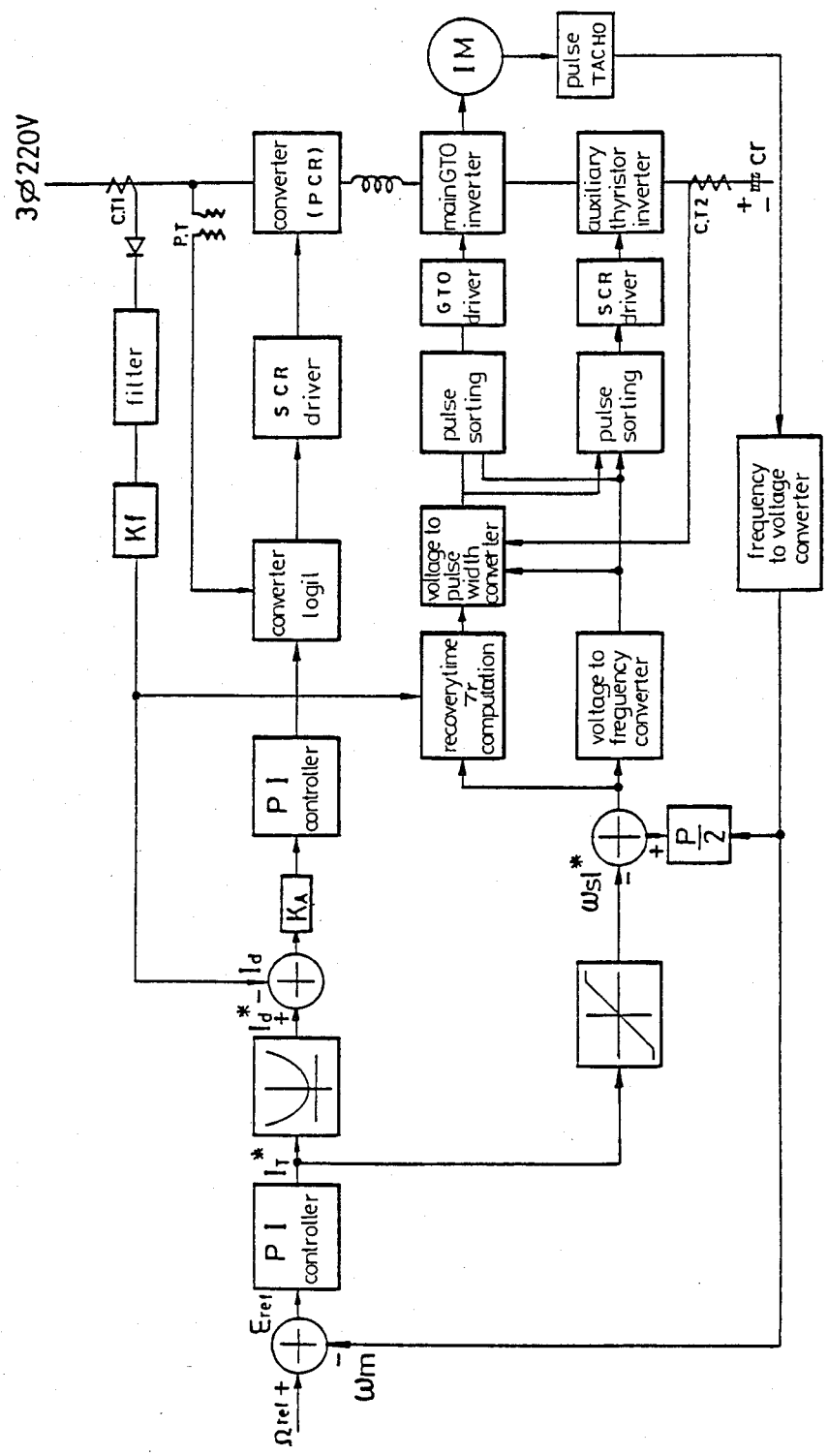
FIG. 19 shows a block diagram of the circuit for controlling the AC motor in a case of FIG. 6.

Up to this point, the operation principles and the characteristics of the SRCI system according to the present invention have been described. FIG. 19 shows a block diagram, of an embodiment, for use in controlling an induction motor according to the present invention. It is made in such a manner that the converter is controlled in order to reduce the difference between the motor speed sensed by the tachometer (TACHO) and the given speed command ($\Omega$m, ref) and, at the same time, the frequency of the inverter is controlled. It is not quite different from the well-known method except for the means to for controlling the period $\tau p$ of the recovered discharge. In other words, the essential characteristic of the SRCI system of the present invention lies in controlling the period $\tau p$ of the recovered discharge (=the period of the mode of FIG. 7B). The method of control of $\tau p$ comprises control to a constant value irrespective of the current $I_s$ at the DC source as shown in FIG. 12 and the change to a function of $I_s$ as shown in FIG. 14.

Figure 20:
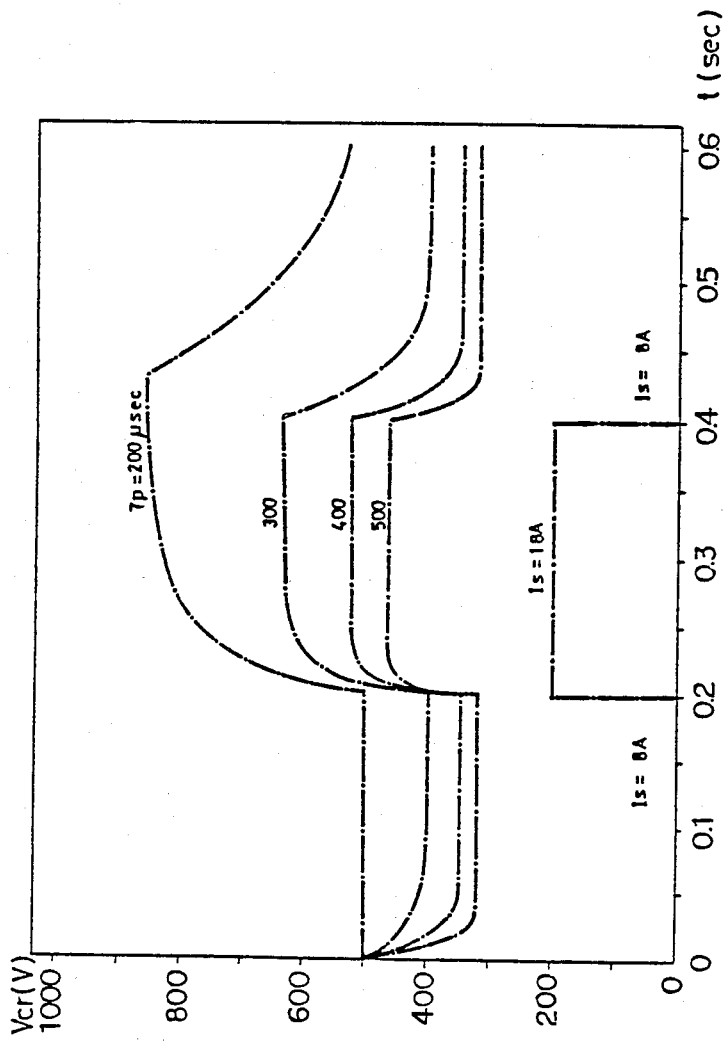
FIG. 20 shows the waveforms of the voltage of the capacitor $C_r$ according to the abrupt variation of DC current $I_s$ when the period $\tau p$ of the mode of FIG. 7B is maintained constant.

The method for controlling $\tau p$ to a constant value has the drawbacks in that it requires a long period of time to accomplish a normal state operation when an abrupt load variation occurs, since the voltage $V_c$ of the capacitor varies depending upon the change of the load current, and the capacitor voltage stresses, that is, the voltage stresses at both sides of the semiconductor elements vary as a function of the current. FIG. 20 shows such phenomena wherein the voltages between both sides of the capacitor vary between 500 and 750 Volt when the current $I_s$ at the DC source side varies abruptly between 8 and 18 Amps in the case where the capacitor value is 100 μF and $\tau p$ is 275 μsec. for the above-mentioned induction motor.

On the other hand, in the case where $\tau p$ is controlled as a function of Is, the voltages at both sides of the capacitor can be maintained at a substantially constant value in spite of the load variations.

Therefore, such a control can eliminate almost all the transition states by corresponding sensibly with the variation of the load and can maintain the voltage stresses at both sides of the capacitor as being suitably constant, thereby improving the reliability, economical selection and operation of the inverter.

Figure 21:
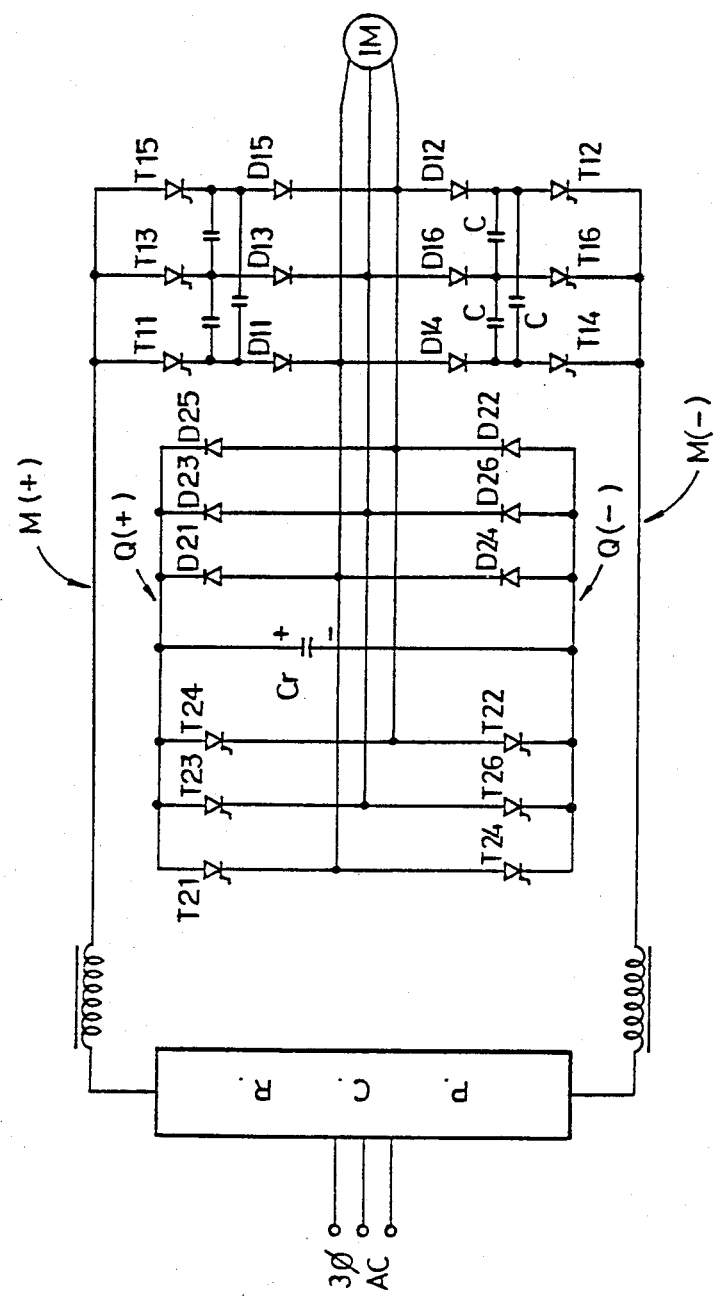
FIG. 21 shows a circuit diagram of another embodiment of the main inverter in FIG. 6.
Figure 22:
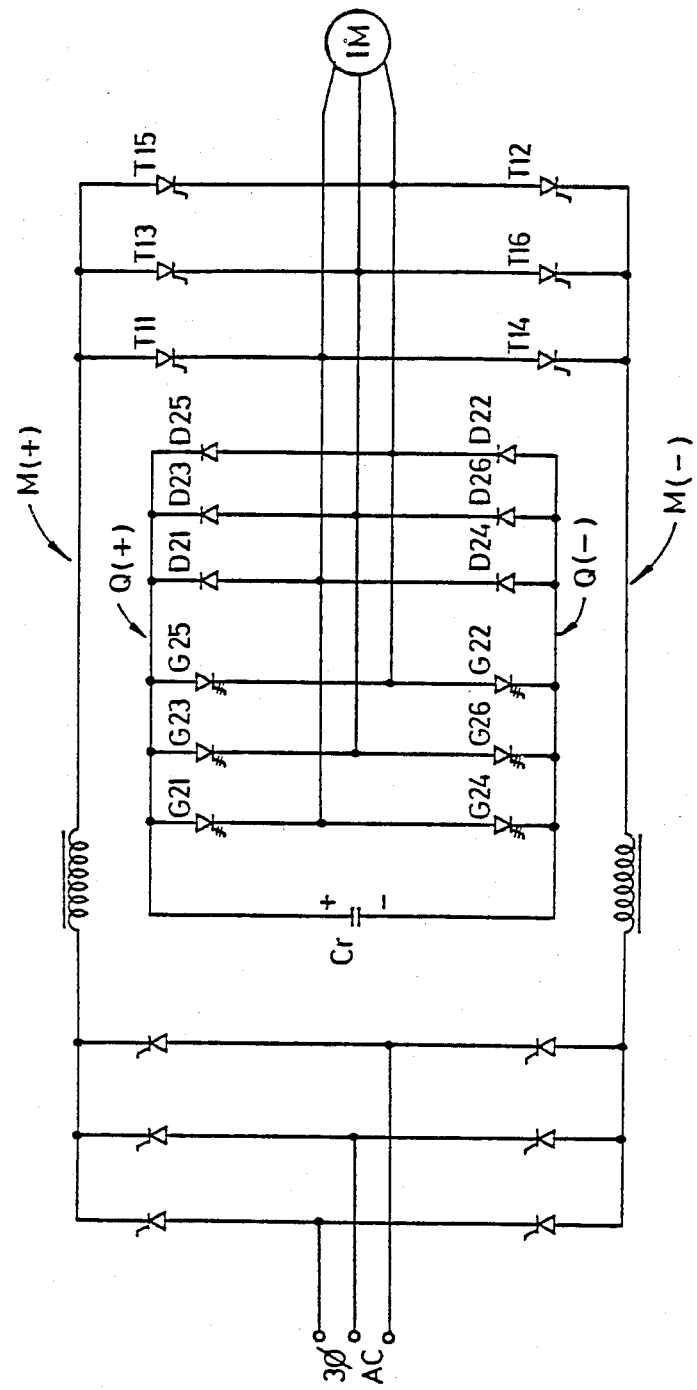
FIG. 22 shows a circuit diagram of yet another embodiment of the main inverter and the auxiliary inverter in FIG. 6.

FIGS. 21 and 22 show a modification of FIG. 6, which is the basic diagram of the present invention. In FIG. 21, only the form of the main inverter connected to the busses M(+), M(−) is modified. That is, in comparison with FIG. 6, GTO elements G11–G16 are replaced by the thyristors T11–T16, and the six capacitors C are connected between the thyristors and the diodes D11–D16 to have the same form as in the prior art ASCI. If GTO's are used, some problems may be avoided, since the ON/OFF control of the element itself is easily performed. But, if the thyristors are used, the six capacitors in the same form as in the ASCI are required for ON/OFF control. However, the size of the capacitors used in the main inverter is quite smaller than that of the capacitors used in the prior art ASCI. The reasons are that the peak voltage stresses are small because the voltages at both sides of the capacitors C are limited to those at both sides of $C_r$, and the capacitors C are required to store only the energy needed to turn off the thyristors in the ON state. The basic principles of the operation of the auxiliary inverter T21-T26 are the same as those for the circuit shown in FIG. 6 and, thus, a further explanation is omitted herein.

FIG. 22 shows a circuit configuration wherein the positions of the GTO's of the main inverter and of the thyristors of the auxiliary inverter are exchanged with each other when compared with FIG. 6.

That is, GTO's G11-G16 are exchanged with thyristors T11-T16, and thyristors T21-T26 are exchanged with GTO's G21-G26. The reason why diodes D11-D16 are eliminated from the main inverter is that the thyristors T11-T16 used in FIG. 22 can be, differently from GTO's G11-G16, resistant to not only forward direction voltage stress but also reverse direction voltage stress. In FIG. 22, the basic functions of the main inverter and the auxiliary inverter are the same as those of FIG. 6 except for the method of commutation. In other words, the auxiliary inverters G21-G26 perform the functions which comprise not only self commutation but also forced commutation of the main inverter thyristors T11-T16 in FIG. 22, whereas the thyristors of the auxiliary inverter are subjected to natural commutation when the GTOs of the main inverter repeat the ON and the OFF states of the inverter in FIG. 6. That is, the commutation of the main inverter, in the case of FIG. 22, can be controlled by controlling the GTO's of the auxiliary inverter between the states of FIG. 7B and the state of FIG. 7C.

Figure 23:
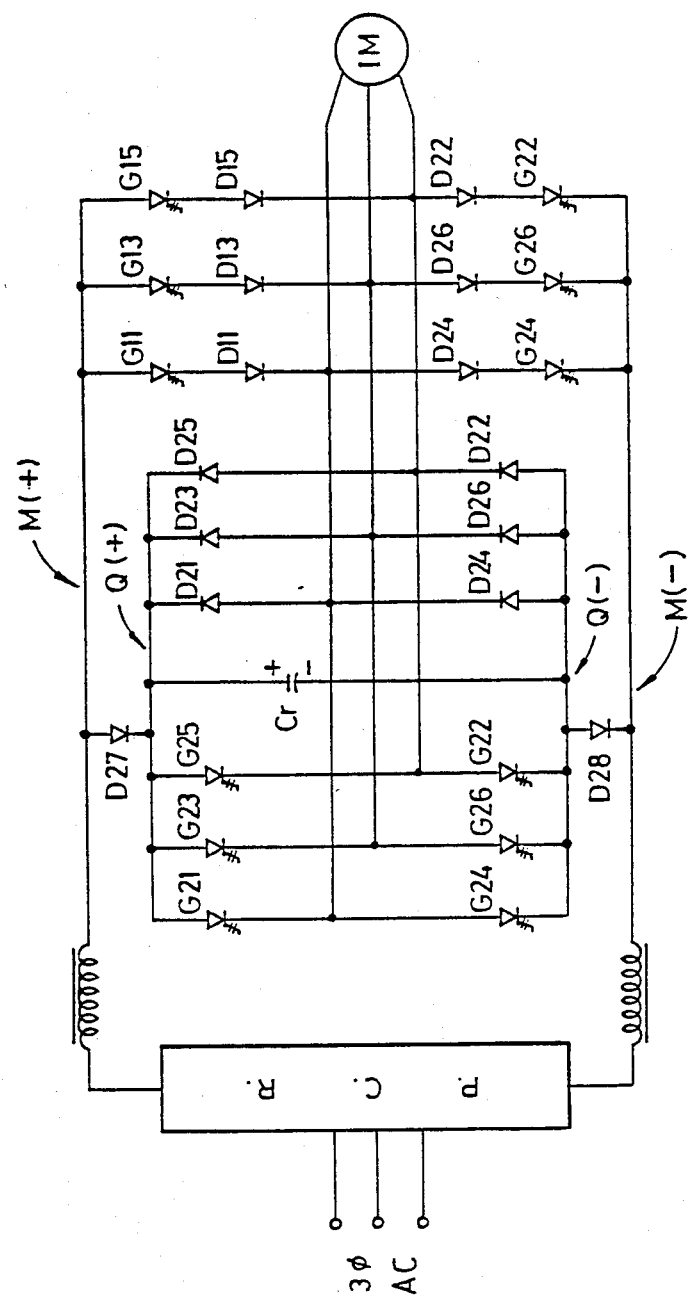
FIG. 23 shows a circuit diagram of yet another embodiment of the auxiliary inverter in FIG. 6.

FIG. 23 shows a circuit wherein all elements are self commutation type devices, achieved by replacing thyristors T21-T26 with GTOs G21-G26. The operation principles are the same as those of the circuit FIG. 6 and preclude the chance of failure during commutation by using the self commutation type devices in the auxiliary inverter. Diodes D27 and D28 are added to limit the high voltage stress which may occur at both sides of the main DC bus M(+)), M(−) in case the main inverter elements G11-G16 fail to control ON/OFF operation suitably to the voltage at both sides of the capacitor $C_r$, and clamp diodes D27 and D28 are inactive under normal state operation.

The characteristics of the SRCI system according to the present invention discussed above will be summarized as follows:

1. The system can operate over a wider range than the prior art system;

2. It is also suitable for driving a large electric power AC motor;

3. It can reduce the voltage stresses on the thyristors and motor terminals by controlling the peak voltage stresses to be quite low in comparison with the prior art ASCI system;

4. The limiting of the peak voltage and the recovery and absorption of the energy during commutation are performed by the function of a small DC capacitor $C_r$;

5. It can operate at high efficiency due to the reduced energy loss during commutation;

6. It can be made by using much lower voltage rating semiconductors, and with lowered costs;

7. It can be safely protected from short circuiting of the load;

8. The waveforms of the load current include less higher harmonic frequencies, and the magnitude of the harmonic torque is small when operated at low frequency; and 9. The regenerative braking of the motor is possible.

What is claimed is:

1. A simultaneous recovery commutation current source inverter for driving AC motors, comprising:

DC current source means for converting AC current input thereto into filtered DC source current output to a positive main buss and a negative main buss;

main inverter means operably connected across said positive and negative main busses and having a plurality of AC outputs adapted for operable connection to power terminals of an AC motor, for inverting said DC source current from said positive and negative main busses into AC output current output to said AC outputs, said main inverter means including first semiconductor switching means operable for commutating said source DC current into said AC output current, blocking diode means being provided in operable series connection with said first semiconductor switching means between said first semiconductor switching means and said AC outputs; and auxiliary inverter means operably connected in parallel with said AC outputs of said main inverter means and having a positive auxiliary DC source buss and a negative auxiliary DC source buss, a DC capacitor operably connected between said positive and negative auxiliary DC source busses, rectifying circuit means operably connected between said positive and negative auxiliary DC busses in operable parallel connection with said capacitor, and said AC outputs of said main inverter, said auxiliary inverter means having second semiconductor switching means operably connected between said positive and negative auxiliary DC busses in operable parallel connection with said capacitor said diode rectifying means and said AC outputs of said main inverter means, said auxiliary inverter means being operable for selectively charging and discharging said capacitor with constant polarity DC current on said positive and negative auxiliary DC source busses during commutation of said DC source current from said positive and negative main busses into said AC output current by said main inverter means and during output of reactive current from an inductive load operably connected to said AC outputs of said main inverter means, whereby in the commutation of a load current of an inductive load operably connected to said plurality of AC outputs, reactive energy accumulated in said DC capacitor during a previous commutation stage is output to and recovered by said inductive load during a subsequent commutation stage and simultaneous with said recovery said reactive energy accumulated in said DC capacitor during said previous commutation stage acts to cause commutation of said load current by said main inverter means during said subsequent commutation stage.

2. A simultaneous recovery commutation current source inverter according to claim 1, wherein said first semiconductor switching means of said main inverter means are self-commutating devices from the group including gate-turn-off thyristors and transistors.

3. A simultaneous recovery commutation current source inverter according to claim 1, wherein said first semiconductor switching means of said main inverter means are thyristors.

4. A simultaneous recovery commutation current source inverter according to claim 1, further comprising snubber circuit means in operable connection with said first semiconductor switching means for assuring safe switching operation of said first semiconductor switching means.

5. A simultaneous recovery commutation current source inverter according to claim 1, wherein said second semiconductor switching means of said auxiliary inverter means are natural commutation type devices.

6. A simultaneous recovery commutation current source inverter according to claim 1, wherein said second semiconductor switching means of said auxiliary inverter means are thyristors.

7. A simultaneous recovery commutation current source inverter according to claim 1, wherein said first semiconductor switching means of said main inverter means are high reverse voltage breakdown withstanding devices, and wherein said blocking diode means are omitted.

8. A simultaneous recovery commutation current source inverter according to claim 7, wherein said first semiconductor switching means are thyristors, and wherein said second semiconductor switching means are self-commution type devices from the group including gate-turn-off thyristors and transistors, said second semiconductor switching means of said auxiliary inverter means being operable for forcing commutation of said first semiconductor switching means of said main inverter means.

9. A simultaneous recovery commutation current source inverter according to claim 3, further comprising first commutation capacitor means provided in operable connection between cathodes of those thyristors of said main inverter means connected to said positive main buss, and second commutation capacitor means provided in operable connection between anodes of those thyristors of said main invertor means connected to said negative main buss.

* * * * *